US008834695B2

(12) United States Patent
Wang et al.

(10) Patent No.: US 8,834,695 B2
(45) Date of Patent: Sep. 16, 2014

(54) DROPLET MANIPULATIONS ON EWOD MICROELECTRODE ARRAY ARCHITECTURE

(75) Inventors: Gary Chorng-Jyh Wang, Cupertino, CA (US); Ching Yen Ho, Los Gatos, CA (US); Wen Jang Hwang, Fremont, CA (US); Wilson Wen-Fu Wang, San Jose, CA (US)

(73) Assignee: Sparkle Power Inc., San Jose, CA (US)

( * ) Notice: Subject to any disclaimer, the term of this patent is extended or adjusted under 35 U.S.C. 154(b) by 426 days.

(21) Appl. No.: 13/029,137

(22) Filed: Feb. 17, 2011

(65) Prior Publication Data

US 2011/0220505 A1 Sep. 15, 2011

Related U.S. Application Data

(60) Provisional application No. 61/312,240, filed on Mar. 9, 2010, provisional application No. 61/312,242, filed on Mar. 9, 2010, provisional application No. 61/312,244, filed on Mar. 10, 2010.

(51) Int. Cl.
*G01N 27/447* (2006.01)

(52) U.S. Cl.
USPC .......................................... 204/450; 204/600

(58) Field of Classification Search
USPC ................ 204/450–470, 546–550, 600–621, 204/641–645
See application file for complete search history.

(56) References Cited

U.S. PATENT DOCUMENTS

2004/0055891 A1* 3/2004 Pamula et al. .................. 205/98
2010/0032293 A1* 2/2010 Pollack et al. ................ 204/450
2010/0270156 A1* 10/2010 Srinivasan et al. ............ 204/450

* cited by examiner

*Primary Examiner* — Luan Van
*Assistant Examiner* — Maris R Kessel
(74) *Attorney, Agent, or Firm* — Grace Lee Huang; Arch Equity Holdings, LLC

(57) ABSTRACT

A method of manipulating droplet in a programmable EWOD microelectrode array comprising multiple microelectrodes, comprising: constructing a bottom plate with multiple microelectrodes on a top surface of a substrate covered by a dielectric layer; the microelectrode coupled to at least one grounding elements of a grounding mechanism, a hydrophobic layer on the top of the dielectric layer and the grounding elements; manipulating the multiple microelectrodes to configure a group of configured-electrodes to generate microfluidic components and layouts with selected shapes and sizes, comprising: a first configured-electrode with multiple microelectrodes arranged in array, and at least one second adjacent configured-electrode adjacent to the first configured-electrode, the droplet disposed on the top of the first configured-electrode and overlapped with a portion of the second adjacent-configured-electrode; and manipulating one or more droplets among multiple configured-electrodes by sequentially activating and de-activating one or more selected configured-electrodes to actuate droplets to move along selected route.

38 Claims, 43 Drawing Sheets

DROPLET MANIPULATIONS ON EWOD MICROELECTRODE ARRAY ARCHITECTURE

CROSS REFERENCE TO RELATED APPLICATIONS

The present application claims benefit of priority under 35 U.S.C. 119(e) to: U.S. Patent Application 61/312,240, entitled "Field-Programmable Lab-on-a-Chip and Droplet Manipulations Based on EWOD Micro-Electrode Array Architecture" and filed Mar. 9, 2010; U.S. Patent Application 61/312,242, entitled "Droplet Manipulations on EWOD-Based Microelectrode Array Architecture" and filed Mar. 9, 2010; U.S. Patent Application 61/312,244, entitled "Micro-Electrode Array Architecture" and filed Mar. 10, 2010. The foregoing applications are hereby incorporated by reference into the present application in their entireties.

The present application also incorporates by reference in its entirety U.S. Patent Application No. 20110247938, entitled "Field-Programmable Lab-on-a-Chip Based on Microelectrode Array Architecture", and filed on the same date as the present application, namely, Feb. 17, 2011; U.S. Patent Application No. 20110247934, entitled "Microelectrode Array Architecture", and filed on the same date as the present application, namely, Feb. 17, 2011.

FIELD OF THE INVENTION

The present invention relates to EWOD-based microfluidic systems and methods. More specifically, the present invention relates to the methods and system for droplet manipulation employing EWOD microelectrode array architecture technique.

BACKGROUND OF THE INVENTION

Microfluidics technology has grown explosively over the last decade for the potential to carry out certain chemical, physical or biotechnological processing techniques. Microfluidics refers to the manipulation of minute quantities of fluid, typically in the micro- to nano-liter range. The use of planar fluidic devices for performing small-volume chemistry was first proposed by analytical chemists, who used the term "miniaturized total chemical analysis systems" (μTAS) for this concept. An increasing number of researchers from many disciplines other than analytical chemistry have embraced the fundamental fluidic principle of μTAS as a way of developing new research tools for chemical and biological applications. To reflect this expanded scope, the broader terms "microfluidics" and "Lab-on-a-chip (LOC)" are now often used in addition to μTAS.

The first generation microfluidic technologies are based on the manipulation of continuous liquid flow through microfabricated channels. Actuation of liquid flow is implemented either by external pressure sources, integrated mechanical micropumps, or by electrokinetic mechanisms. Continuous-flow systems are adequate for many well-defined and simple biochemical applications, but they are unsuitable for more complex tasks requiring a high degree of flexibility or complicated fluid manipulations. Droplet-based microfluidics is an alternative to the continuous-flow systems, where the liquid is divided into discrete independently controllable droplets, and these droplets can be manipulated to move in channels or on a substrate. By using discrete unit-volume droplets, a microfluidic function can be reduced to a set of repeated basic operations, i.e., moving one unit of fluid over one unit of instance. A number of methods for manipulating microfluidic droplets have been proposed in the literature. These techniques can be classified as chemical, thermal, acoustical, and electrical methods. Among all methods, electrical methods to actuate droplets have received considerable attention in recent years.

Electrowetting-on-dielectric (EWOD) is one of the most common electrical methods. Digital microfluidics such as the Lab-on-a-chip (LOC) generally means the manipulation of droplets using EWOD technique. The conventional EWOD-based LOC device generally includes two parallel glass plates. The bottom plate contains a patterned array of individually controllable electrodes, and the top plate is coated with a continuous ground electrode. Electrodes are preferably formed by a material like indium tin oxide (ITO) that have the combined features of electrical conductivity and optical transparency in thin layer. A dielectric insulator coated with a hydrophobic film is added to the plates to decrease the wettability of the surface and to add capacitance between the droplet and the control electrode. The droplet containing biochemical samples and the filler medium are sandwiched between the plates while the droplets travel inside the filler medium. In order to move a droplet, a control voltage is applied to an electrode adjacent to the droplet and at the same time the electrode just under the droplet is deactivated.

Unfortunately, the conventional LOC systems employing EWOD technique built to date are still highly specialized to particular applications. The current LOC systems rely heavily on the manual manipulation and optimization of the bioassays. Moreover, current applications and functions in the EWOD-LOC system are time-consuming and require costly hardware design, testing and maintenance procedures. The most disadvantages about the conventional EWOD-LOC systems are the design of "hardwired" electrodes. "Hardwired" means the shapes, the sizes, locations, and the electrical wiring traces to the controller of the electrodes are physically confined to permanently etched structures. Regardless of their functions, once the electrodes are fabricated, their shapes, sizes, locations and traces can't be changed. So therefore it may result in high non-recurring engineering costs, as well as the limited ability to update the functionality after shipping or partially re-configuring the LOC design.

There is a need in the art for a system and method for reducing the labor and cost associated with generating the microfluidic systems with the droplet manipulation. EWOD microelectrode array architecture technique can provide the field-programmability that the electrodes and the overall layout of the LOC can be software programmable. A microfluidic device or embedded system is said to be field-programmable or on-site programmable if its firmware (stored in non-volatile memory, such as ROM) can be modified "in the field," without disassembling the device or returning it to its manufacturer. This is often an extremely desirable feature, as it can reduce the cost and turnaround time for replacement of buggy or obsolete firmware. The ability to update the functionality after shipping, partial re-configuration of the portion of the design and the low non-recurring engineering costs relative to LOC design can offer advantages for many other applications.

The art raises the LOC designs to the application level to relieve LOC designers from the burden of manual optimization of bioassays, time-consuming hardware design, costly testing and maintenance procedures.

Also, based on the novel EWOD Microelectrode Array Architecture, the art to manipulate droplets in LOC systems can be dramatically improved. There are various embodiments of present invention in the advanced manipulations of droplets in creating, transportation, mixing and cutting based on the EWOD Microelectrode Array Architecture.

SUMMARY

Disclosed herein is a method of manipulating droplet in a programmable EWOD microelectrode array comprising multiple microelectrodes. In one embodiment, the method includes: (a) constructing a bottom plate comprising an array of multiple microelectrodes disposed on a top surface of a substrate covered by a dielectric layer; wherein each of the microelectrode is coupled to at least one grounding elements of a grounding mechanism, wherein a hydrophobic layer is disposed on the top of the dielectric layer and the grounding elements to make hydrophobic surfaces with the droplets; (b) manipulating the multiple microelectrodes to configure a group of configured-electrodes to generate microfluidic components and layouts with selected shapes and sizes, wherein the configured-electrodes including: a first configured-electrode comprising multiple microelectrodes arranged in array, and at least one second adjacent configured-electrode adjacent to the first configured-electrode, the droplet being disposed on the top of the first configured-electrode and overlapped with a portion of the second adjacent-configured-electrode; and, (c) manipulating one or more droplets among the multiple configured-electrodes by sequentially applying driving voltages activating and de-activating one or more selected configured-electrodes to sequentially activate/deactivate the selected configured-electrodes to actuate droplets to move along selected route.

Still In another embodiment, a method of manipulating droplet in a programmable EWOD microelectrode array comprising multiple microelectrodes, the method including: (a) constructing a bottom plate comprising an array of multiple microelectrodes disposed on a top surface of a substrate covered by a dielectric layer; wherein each of the microelectrode is coupled to at least one grounding elements of a grounding mechanism, wherein a hydrophobic layer is disposed on the top of the dielectric layer and the grounding elements to make hydrophobic surfaces with the droplets; (b) manipulating the multiple microelectrodes to configure a group of configured-electrodes to generate microfluidic components and layouts with selected shapes and sizes, wherein the configured-electrodes including: a first configured-electrode comprising multiple microelectrodes arranged in array, and at least one second adjacent configured-electrode adjacent to the first configured-electrode, the droplet being disposed on the top of the first configured-electrode and overlapped with a portion of the second adjacent-configured-electrode; (c) deactivating the first configured-electrode and activating the second adjacent configured-electrode to pull the droplet from the first configured-electrode onto the second configured-electrode, and; (d) manipulating one or more droplets among the multiple configured-electrodes by sequentially applying driving voltages activating and de-activating one or more selected configured-electrodes to sequentially activate/deactivate the selected configured-electrodes to actuate droplets to move along selected route.

In another embodiment, a method of manipulating droplet in a programmable EWOD microelectrode array comprising multiple microelectrodes, the method including: (a) constructing a bottom plate comprising an array of multiple microelectrodes disposed on a top surface of a substrate covered by a dielectric layer; wherein each of the microelectrode is coupled to at least one grounding elements of a grounding mechanism, wherein a hydrophobic layer is disposed on the top of the dielectric layer and the grounding elements to make hydrophobic surfaces with the droplets; (b) manipulating the multiple microelectrodes to configure a group of configured-electrodes to generate microfluidic components and layouts with selected shapes and sizes, wherein the configured-electrodes including: a first configured-electrode comprising multiple microelectrodes arranged in array, and at least one second adjacent configured-electrode adjacent to the first configured-electrode, the droplet being disposed on the top of the first configured-electrode and overlapped with a portion of the second adjacent-configured-electrode; (c) configuring a third neighboring configured-electrode not overlapped with the droplet on the first configured-electrode, and, (d) manipulating one or more droplets among the multiple configured-electrodes by sequentially applying driving voltages activating and de-activating one or more selected configured-electrodes to sequentially activate/deactivate the selected configured-electrodes to actuate droplets to move along selected route.

Still in another embodiment, The EWOD Microelectrode Array Architecture of the present invention employs the "dot matrix printer" concept that a plurality of microelectrodes (e.g., "dots") are grouped and are simultaneously activated/deactivated to form varied shapes and sizes of electrodes to meet the requirements of fluidic operational functions in field applications.

In another embodiment, all EWOD microfluidic components can be generated by grouping the multiple microelectrodes, including, but not limit to, reservoirs, electrodes, mixing chambers, droplet pathways and others. Also physical layouts of the LOC for the locations of I/O ports, reservoirs, electrodes, pathways and electrode networks all can be done by configurations of microelectrodes. The grouped microelectrodes after the configuration are configured electrodes to distinguish it from the conventional electrodes.

In another embodiment, the varied shapes of sizes of configured-electrodes such as reservoirs, electrodes, mixing chambers, droplet pathways and physical layouts of the LOC for the locations of I/O ports, reservoirs, electrodes, pathways and electrode networks of the microfluidic system are able to be software programmed, re-configured and field-programmed to meet the requirements of operational functions in field applications.

In other embodiments, the bi-planar structure can be employed in the design of EWOD Microelectrode Array Architecture in the manipulation of droplets in which the upper top plate is implemented in the system.

Still in another embodiment, the design of the EWOD Microelectrode Array Architecture in the manipulation of droplets can be based on a coplanar structure in which the EWOD actuations can occur in the single plate configuration without the top plate.

In another embodiment, the method of creating a LOC structure to accommodate the widest range of droplet sizes and volumes by a coplanar structure with a removable, adjustable and transparent top plate to accommodate the widest range of droplet sizes and volumes under the EWOD Microelectrode Array Architecture.

In yet other embodiments, all typical EWOD microfluidic operations can be performed by configuring and controlling of the "configured-electrodes" under the EWOD Microelectrode Array Architecture. "Microfluidic operations" means any manipulation of a droplet on a droplet microactuator. A microfluidic operation may, for example, include: loading a droplet into the droplet microactuator; dispensing one or more droplets from a source droplet; splitting, separating or dividing a droplet into two or more droplets; transporting a droplet from one location to another in any direction; merging or combining two or more droplets into a single droplet; diluting a droplet; mixing a droplet; agitating a droplet; deforming a droplet; retaining a droplet in position; incubating a droplet; disposing of a droplet; transporting a droplet out of a droplet microactuator; and/or any combination of the foregoing.

In yet another embodiment, besides the conventional control of the configured electrodes to perform typical microfluidic operations, special control sequences of the microelectrodes can offer advanced microfluidic operations in manipulations of droplets. Advanced microfluidic operations based on the EWOD Microelectrode Array Architecture may include: transporting droplets diagonally or in any directions; transporting droplets through the physical gaps by Interim bridging" technique; transporting droplets by Electrode Column Actuation; Washing out dead volumes; transporting droplets in lower driving voltage situation; transporting droplets in controlled low speed; performing precise cutting; performing diagonal cutting; performing coplanar cutting; merging droplets diagonally; deforming droplets to speed mixing; improving mixing speed by uneven back-and-forth mixer; improving mixing speed by circular mixer; improving mixing speed by multilaminates mixer; and/or any combination of the foregoing.

While multiple embodiments are disclosed, still other embodiments of the present invention will become apparent to those skilled in the art from the following detailed description, which shows and describes illustrative embodiments of the invention. As will be realized, the invention is capable of modifications in various aspects, all without departing from the spirit and scope of the present invention. Accordingly, the drawings and detailed description are to be regarded as illustrative in nature and not restrictive.

DETAILED DESCRIPTION

Figure 1A:
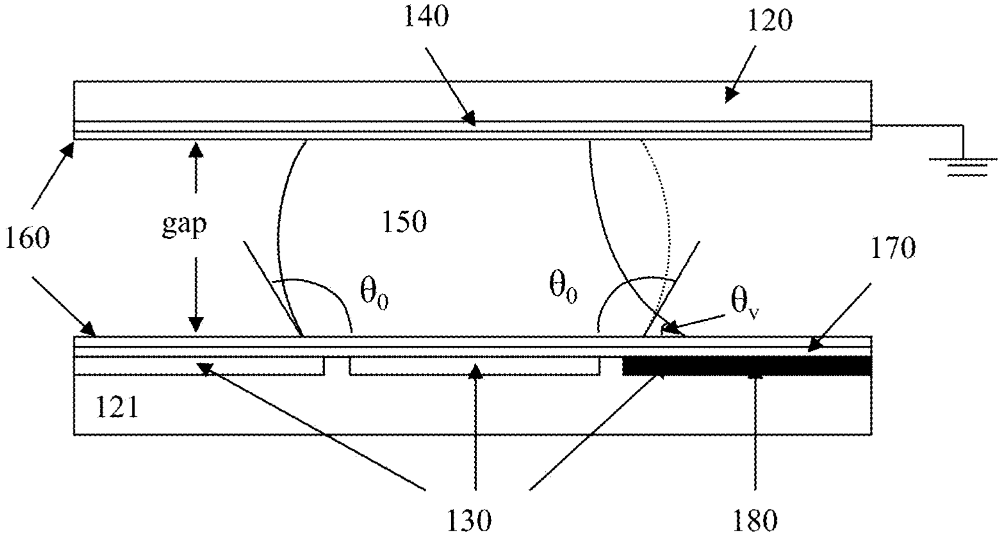
FIG. 1A is a cross-section view generally illustrating the conventional sandwiched EWOD system.

Referring to FIG. 1A, a conventional electrowetting microactuator mechanism (in small scale for illustration purposes only) is illustrated in FIG. 1A. EWOD-based digital microfluidic device 100 consists of two parallel glass plates 120 and 121, respectively. The bottom plate 121 contains a patterned array 130 of individually controllable electrodes, and the top plate 120 is coated with a continuous ground electrode 140. Electrodes are preferably formed by a material, such as indium tin oxide (ITO) that has the combined features of electrical conductivity and optical transparency in thin layer.

A dielectric insulator 170, e.g., parylene C, coated with a hydrophobic film 160 such as Teflon AF, is added to the plates to decrease the wettability of the surface and to add capacitance between the droplet and the control electrode. The droplet 150 containing biochemical samples and the filler medium, such as the silicone oil or air, are sandwiched between the plates to facilitate the transportation of the droplet 150 inside the filler medium. In order to move a droplet 150, a control voltage is applied to an electrode 180 adjacent to the droplet and at the same time the electrode just under the droplet 150 is deactivated.

Figure 1B:
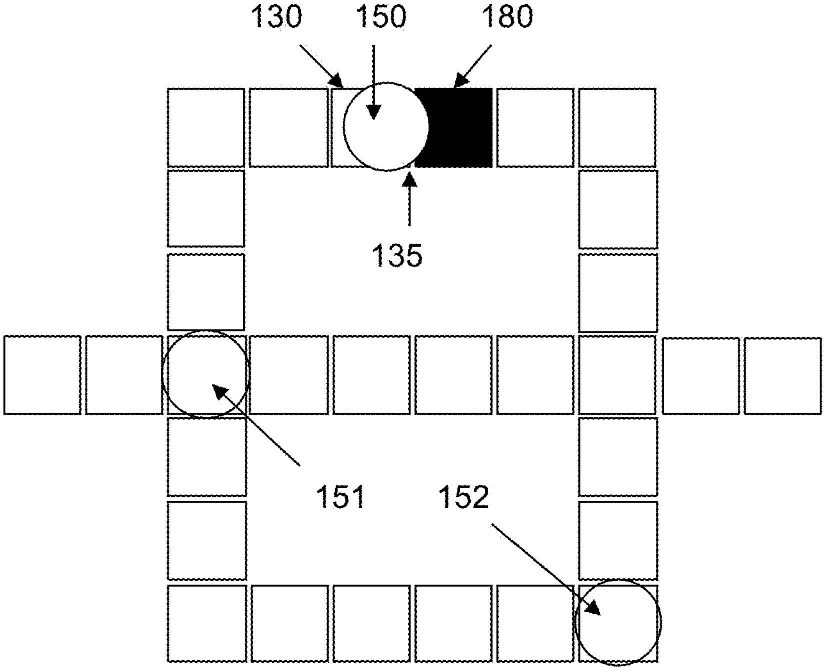
FIG. 1B is a top view generally illustrating the conventional EWOD two-dimensional electrode array.

FIG. 1B is a top view generally illustrating the conventional EWOD on a two dimensional electrode array 190. A droplet 150 is moving from electrode 130 into an activated electrode 180. The black color of electrode 180 indicates when a control voltage is applied. The EWOD effect causes an accumulation of charge in the droplet/insulator interface, resulting in an interfacial tension gradient across the gap 135 between the adjacent electrodes 130 and 180, which consequently causes the transportation of the droplet 150. By varying the electrical potential along a linear array of electrodes, electrowetting can be used to move nanoliter-volume liquid droplets along this line of electrodes. The velocity of the droplet can be controlled by adjusting the control voltage in a range from 0-90 V, and droplets can be moved at speeds of up to 20 cm/s. Droplets 151 and 152 can also be transported, in user-defined patterns and under clocked-voltage control, over a 2-D array of electrodes without the need for micropumps and microvalves.

EWOD based microfluidic devices use the interfacial tension gradient across the gap between the adjacent electrodes to actuate the droplets. The designs of electrodes include the desired shapes, sizes of each of the electrode and the gaps between each of the two electrodes. In the EWOD based design, the droplet pathways generally are composed of a plurality of electrodes that connect different areas in the design. These electrodes can be used either for transporting procedure or for other more complex operations such as mixing and cutting procedures in the droplet manipulation.

The present invention employs the "dot matrix printer" concept that each microelectrode in the EWOD Microelectrode Array Architecture is a "dot" which can be used to form all EWOD microfluidic components. In other words, each of the microelectrodes in the microelectrode array can be configured to form various microfluidic components in different shapes and sizes. According to customer's demand, multiple microelectrodes can be deemed as "dots" that are grouped and can be activated simultaneously to form different configured-electrodes and perform microfluidic operations. Activate means to apply necessary electrical voltages to the electrodes that the EWOD effect causes an accumulation of charge in the droplet/insulator interface, resulting in an interfacial tension gradient across the gap between the adjacent electrodes, which consequently causes the transportation of the droplet. Deactivate means to remove the applied electrical voltages from the electrodes.

Figure 2:
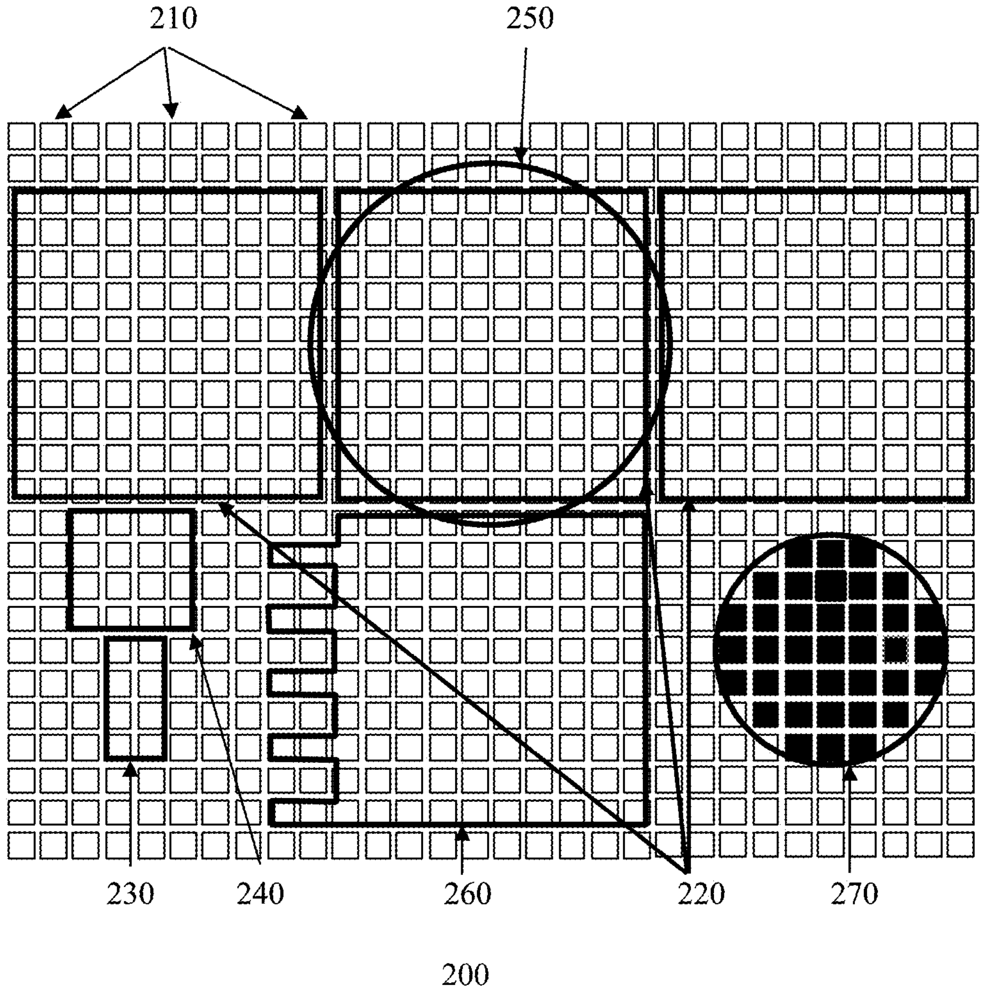
FIG. 2 is a diagram generally illustrating the microelectrode array that can be configured into various shape and size of configured-electrodes.

FIG. 2 illustrates one embodiment of the EWOD microelectrode array architecture technique of the present invention. In this embodiment, the microelectrode array 200 is composed of a plurality (30×23) of identical microelectrodes 210. This microelectrode array 200 is fabricated based on the standard microelectrode specification (shown here as microelectrode 210) and fabrication technologies that are independent from the ultimate LOC applications and the detail microfluidic operation specifications. In another word, this microelectrode array 200 is a "blank" or "pre-configuration" LOC. Based on the application needs, then this microelectrode array can be configured or software programmed into the desired LOC. As shown in FIG. 2, each of the configured-electrode 220 is composed of 100 microelectrodes 210 (i.e., 10×10 microelectrodes). "Configured-electrode" means the 10×10 microelectrodes 210 are grouped together to perform as an integrated electrode 220 and will be activated or deactivated together at the same time. Normally, the configuration data is stored in non-volatile memory (such as ROM) and can be modified "in the field," or "on-site" in any designated location without disassembling the device or returning it to its manufacturer. FIG. 2 shows a droplet 250 sits on the center configured-electrode 220.

As shown in FIG. 2, the sizes and shapes of the configured-electrodes of the present invention can be designed based on application needs. Examples of the control of the sizes of the configured-electrodes are configured-electrodes 220 and 240. Configured-electrode 220 has the size of 10×10 microelectrodes and configured-electrode 240 has the size of 4×4 microelectrodes. Besides the configuration of the sizes of the configured-electrodes, different shapes of the configured-electrodes also can be configured by using the microelectrode array. While configured-electrode 220 is square, configured-electrode 230 is composed of 2×4 microelectrodes in rectangular shape. Configured-electrode 260 is left-side-toothed-square, and configured-electrode 270 is round shape.

Also, as shown in FIG. 2, the volume of the droplet 250 is proportional to the size of the configured-electrode 220. In other words, by controlling the size of the configured-electrode 220, the volume of the droplet 250 is also limited to fit into the designed size of the configured-electrode 220; therefore the field-programmability of the shape and size of the "configured-electrodes" means the control of droplet volumes. Different LOC applications and microfluidic operations will require different droplet volumes, and a dynamic programmable control of the droplet volumes is a highly desirable function for LOC designers.

Figure 3A:
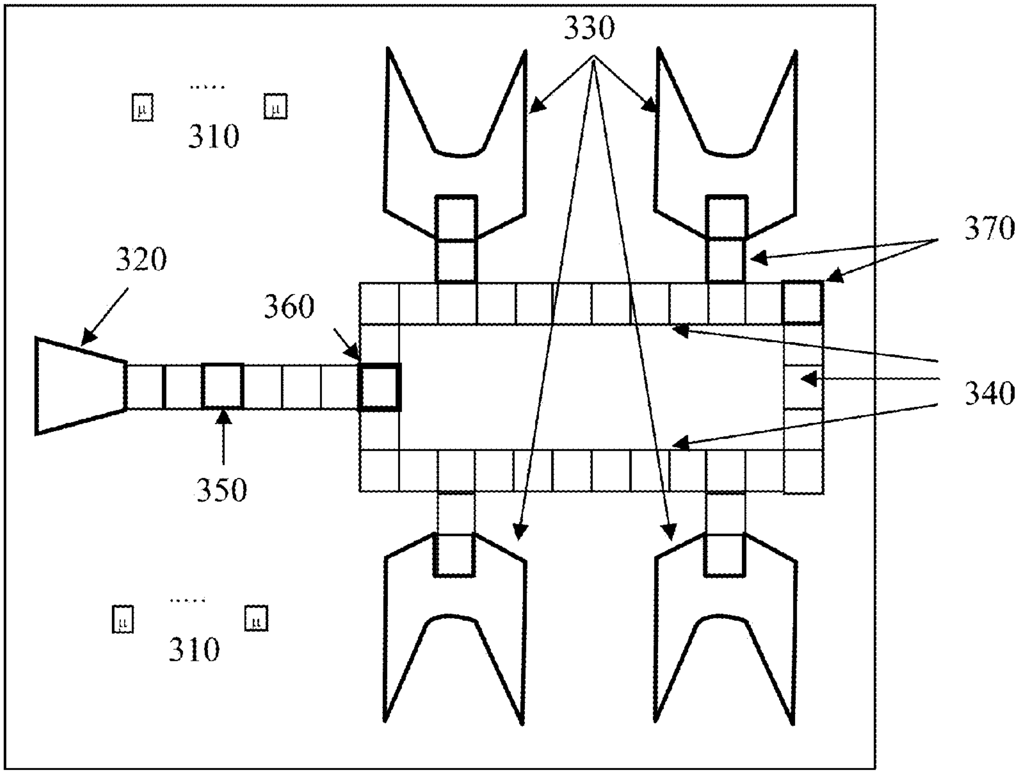
FIG. 3A is the diagram of different shapes of configured-electrodes and the LOC layout using the microelectrode array architecture.

As shown in FIG. 3A, the shapes of the configured-electrodes of the present invention can be designed based on application's needs. The shapes of the configured-electrodes are made of a plurality of microelectrodes. Depending on the design needs, the group of microelectrodes are configured and activated as a group to form the desired shape of the configured-electrode. In the present invention, the shapes of the configured-electrodes can be square, square with tooth edges, hexagonal, or any other shapes. Referring to FIG. 3A, the shapes of configured-electrodes of the transportation path 340, detection window 350 and the mixing chamber 360 are square. The reservoir 330 is special-shaped large sized configured-electrode. The waste reservoir 320 is tetragon shaped.

Figure 3B:
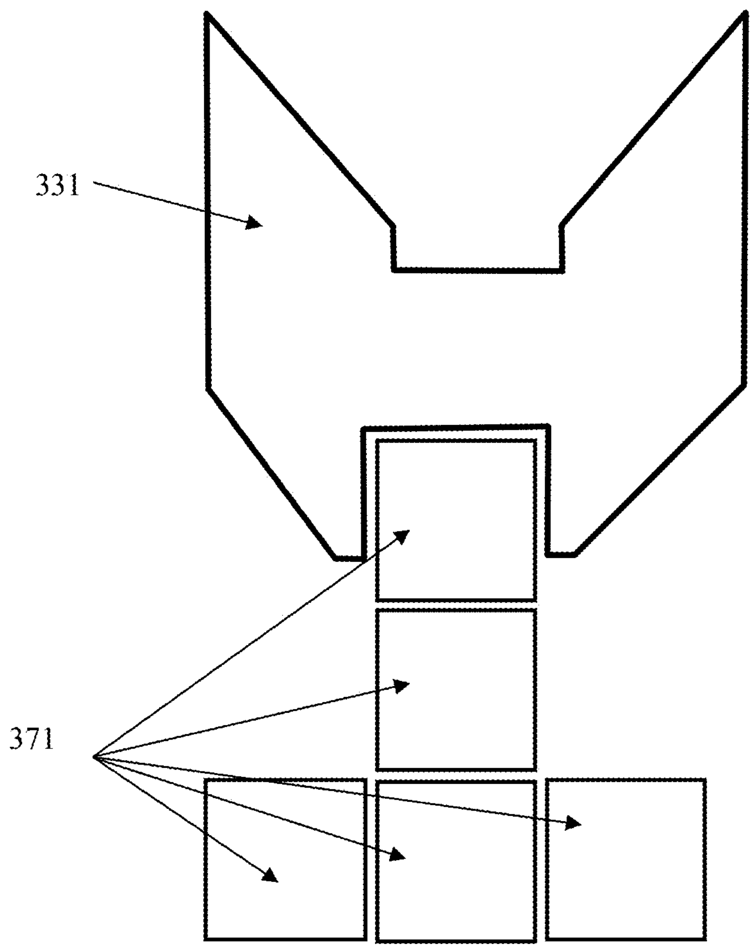
FIG. 3B is a conventional physically etched structure.
Figure 3C:
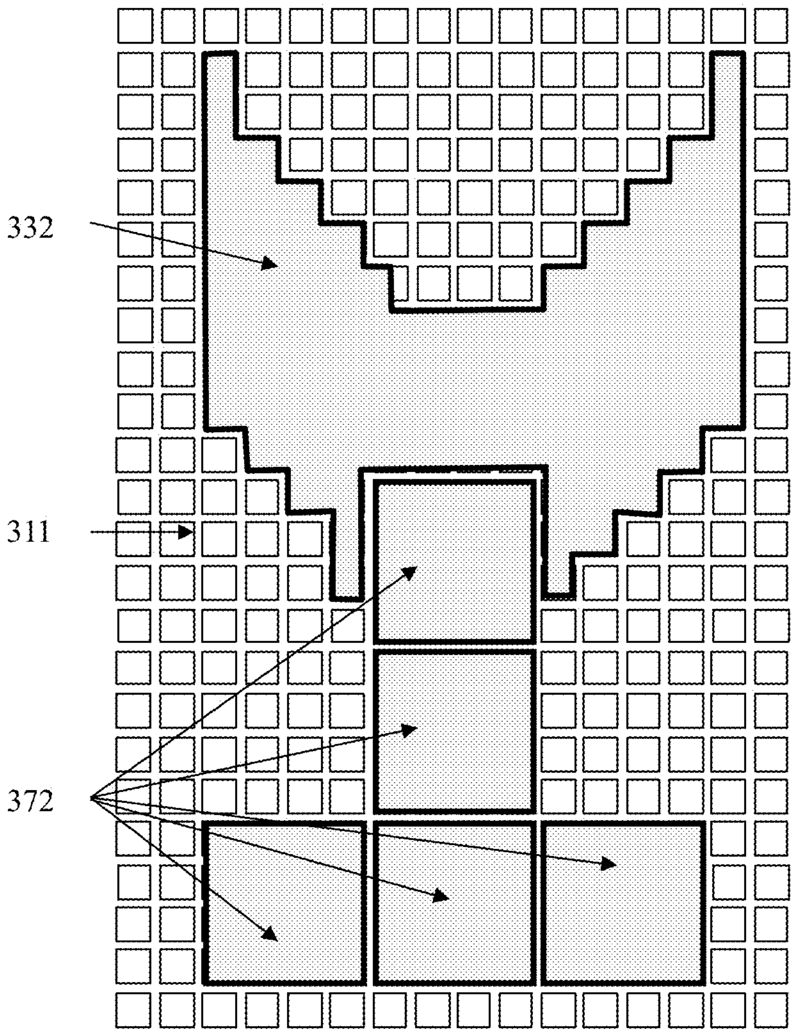
FIG. 3C is the diagram of configured-electrodes for the enlarged section of the reservoir and configured-electrodes.

FIGS. 3B and 3C show the enlarged version of the reservoir 330 from FIG. 3A. FIG. 3B is illustrated as a physically etched reservoir structure 331 manufactured by conventional EWOD-LOC systems. The components show permanently etched reservoir 331 and the four permanently etched electrodes 371. In comparison of FIG. 3B (conventional design), FIG. 3C is a field-programmed LOC structure with similar sized configured reservoir 332 grouped electrodes 372. The configured reservoir 332 can be made by grouping multiple microelectrodes 311 into desired size and shape to make such reservoir component. The grouped electrodes 371 contain 4×4 microelectrodes 311.

After defining the shapes and sizes of the necessary microfluidic components, it's also important to define the locations of the microfluidic components and how these microfluidic components connected together as a circuitry or network. FIG. 3A shows where the physical locations of these microfluidic components are positioned and how these microfluidic components are connected together to perform as a functional LOC. These microfluidic components are: configured-electrodes 370, reservoirs 330, waste reservoir 320, mixing chamber 360, detection window 350 and transportation paths 340 that connect different areas of the LOC. If it's a field-programmable LOC then after the layout design, there are some unused microelectrodes 310. Designers can go for a hard-wired version to save cost after the FPLOC is fully verified then unused microelectrodes 310 can be removed.

The conventional EWOD-based LOC design is based on a bi-planar structure that has a bottom plate containing a patterned array of electrodes, and a top plate coated with a continuous ground electrode. In one embodiment of the present invention, the LOC device employing EWOD microelectrode array architecture technique is based on a coplanar structure in which the actuations can occur in a single plate configuration without the top plate. The coplanar design can accommodate a wider range of different volume sizes of droplets without the constrained of the top plate. The bi-planar structure has a fixed gap between the top plates and has the limitation to accommodate wide range of the volume size of droplets. Still in another embodiment, the LOC devices employing EWOD microelectrode array architecture technique based on the coplanar structure still can add a passive top plate to seal the test surface for the protection of the fluidic operations or for the purpose of protecting the test medium for a longer shelf storage life.

Figure 4:
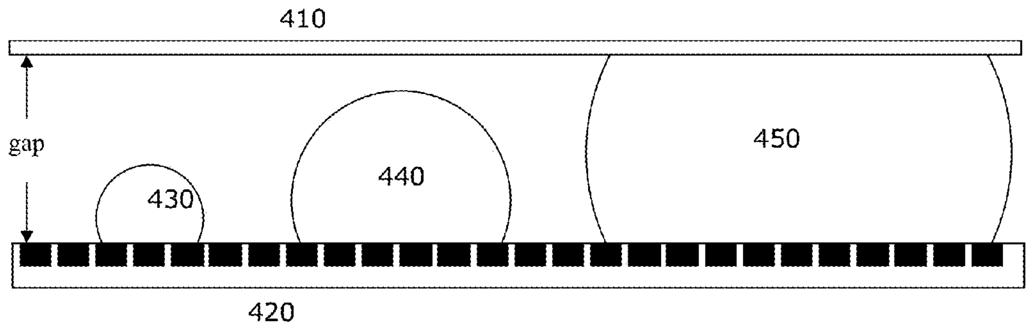
FIG. 4 is a hybrid structure with a removable, adjustable and transparent top plate to accommodate the widest range of droplet sizes and volumes.

In another embodiment, a removable, adjustable and transparent top plate is employed in the coplanar structure for the EWOD microelectrode array architecture technique to optimize the gap distance between the top plate 410 and the electrode plate 420 as shown in FIG. 4. The electrode plate 420 is implemented by the EWOD microelectrode array architecture technique that the side view of the configured-electrode for droplet 430 includes three microelectrodes (shown in black). The configured-electrode for droplet 440 includes six microelectrodes and the configured-electrode for droplet 450 includes eleven microelectrodes. This embodiment is especially useful in the application such as field-programmable LOC. While EWOD microelectrode array architecture provides the field-programmability in configuring the shapes and the sizes of the configured-electrode, a system structure that can accommodate the widest ranges of sizes and volumes of the droplets is highly desirable. Because the wider the droplet sizes and volumes a field-programmable LOC can accommodate, the more applications can be implemented. The optimized gap distance can be adjusted to fit the desired sizes of the droplets. In the present invention, the optimized gaps can be implemented in three approaches: First, all the droplets can be manipulated without touching the top plate 410. This approach is generally applied to the coplanar structure. In a second approach, all droplets can be manipulated by touching the top plate 410 that droplets are sandwiched between the top plate 410 and the electrode plate 420. The second approach is generally applied to bi-planar structure. The third approach or a hybrid approach incorporates the functions of coplanar structure and an adjustable gap between the top cover 410 and the coplanar electrode plate 420. This hybrid approach can be used to provide the droplets with the widest range. As shown in FIG. 4, the droplet 430 and droplet 440 sit within the gap are manipulated without touching the top plate 410. The droplet 450 is manipulated to be sandwiched between the top plate 410 and the electrode plate 420. This invention is not limited to the EWOD microelectrode array architecture technique. It can also be applied to other conventional electrode plates while the applicable ranges of the droplet sizes may be limited.

The plate structure of the microelectrode of Microelectrode Array Architecture can be designed by using scaled-down bi-planar structure based on the popular configuration of EWOD chip today. A bi-planar EWOD based microelectrode structure (in small scale for illustration purposes only) is illustrated in FIG. 1A. Three microelectrodes 130 and two parallel plates 120 and 121 are shown in the figure. The bottom plate 121 contains a patterned array of individually controllable electrodes 130, and the top plate 120 is coated with a continuous ground electrode 140. A dielectric insulator 170 coated with a hydrophobic film 160 is added to the plates to decrease the wettability of the surface and to add capacitance between the droplet and the control electrode. The droplet 150 containing biochemical samples and the filler medium, such as the silicone oil or air, are sandwiched between the plates to facilitate the transportation of the droplet 150 inside the filler medium.

In one embodiment of the present invention, the LOC device employing EWOD microelectrode array architecture technique is based on a coplanar structure in which the actuations can occur in a single plate configuration without the top plate. The coplanar design can accommodate a wider range of different volume sizes of droplets without the constrained of the top plate. The bi-planar structure has a fixed gap between the top plates and has the limitation to accommodate wide range of the volume size of droplets. Still in another embodiment, the LOC devices employing EWOD microelectrode array architecture technique based on the coplanar structure still can add a passive top plate to seal the test surface for the protection of the fluidic operations or for the purpose of protecting the test medium for a longer shelf storage life.

Figure 5A:
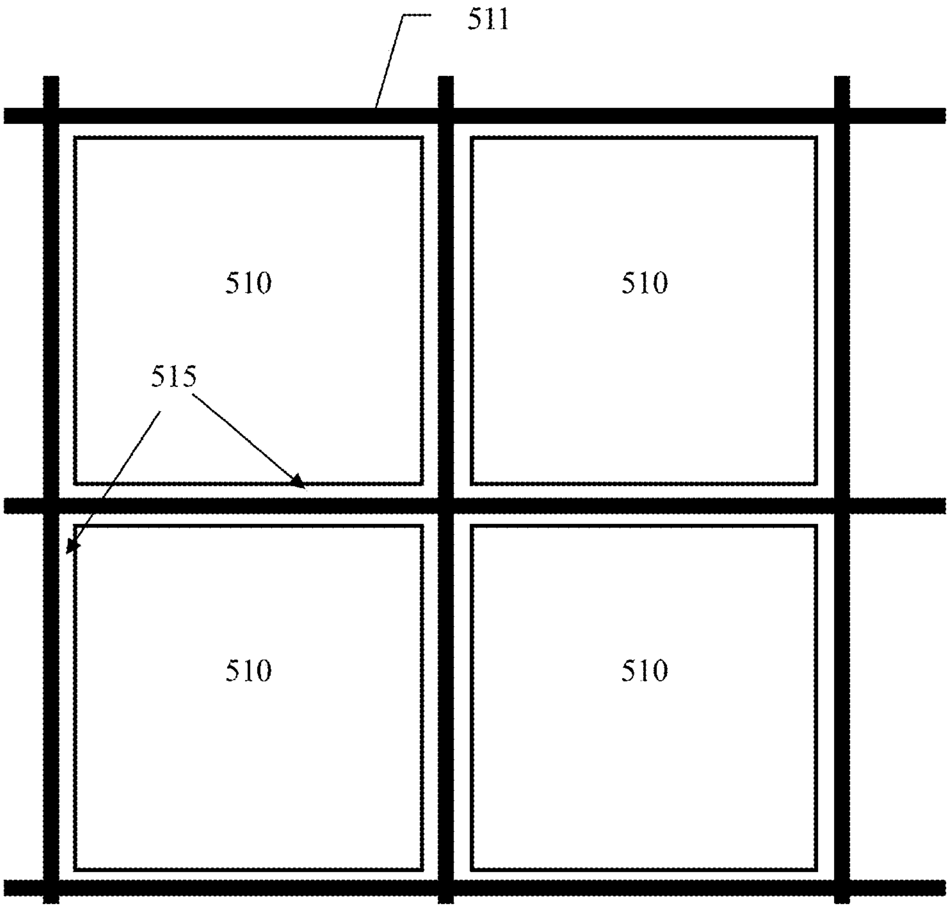
FIGS. 5A, 5B and 5C are diagrams of the "ground girds" coplanar structure.

In the present invention, the microelectrode plate structure can be physically implemented in many ways especially in the coplanar structure. FIG. 5A shows the "ground grids" coplanar microelectrode structure comprises one driving-microelectrode 510, ground lines 511, and gaps 515 between the driving-microelectrode 510 and the ground lines 511. When the electrode is activated, the driving-microelectrode 510 is charged by a DC or square-wave driving voltage. The ground lines 511 are on the same plate with the driving-microelectrode 510 to achieve the coplanar structure. The gap 515 is to ensure no vertical overlapping between 510 and 511.

Figure 5B:
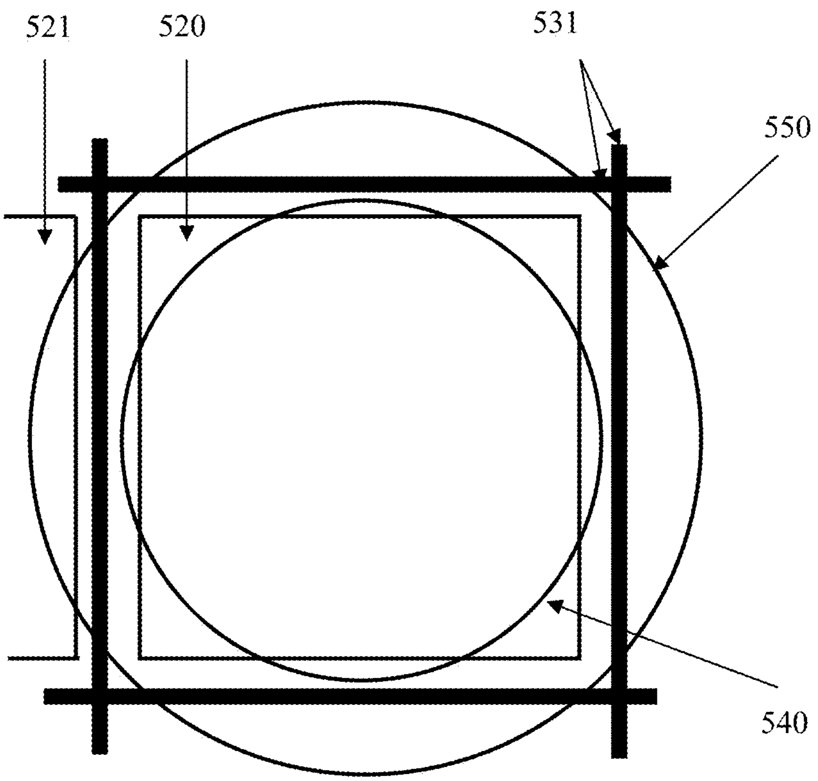

FIG. 5B is the conventional droplet operation unit includes permanently etched electrodes 520, 521, ground lines 531, (in vertical and in horizontal directions). These two etched electrodes 520, 521 are each separated by the ground lines 531 in horizontal and vertical directions. The droplet 540 sits in the electrode 520. As shown in FIG. 5B, the droplet 540 is too small to touch the surrounded ground lines 531 and the actuation of the droplet 540 can't be performed. This could be potential problems in droplet manipulation often observed in conventional droplet system. The general remedy is to load a larger size droplet 550 but it is often difficult to control the desired droplet size manually. Also, limited by the ground lines 531 in the conventional system, electrodes 520 and 521 can't have the interdigitated perimeters to improve droplet manipulations.

Figure 5C:
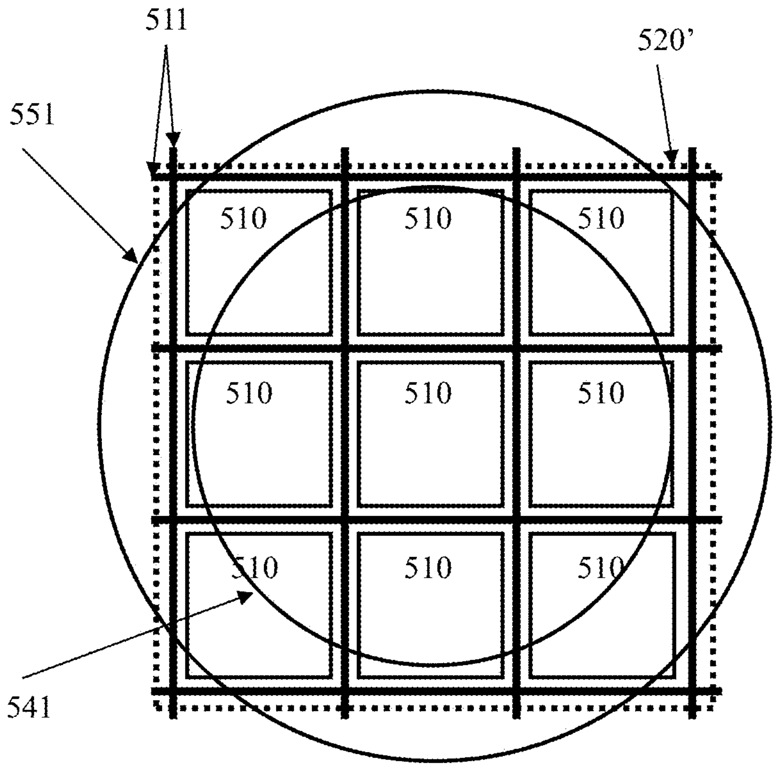

FIG. 5C shows the improved droplet operation unit of the current invention in a coplanar structure. The configured electrode 520' comprises a plurality of field-programmable microelectrodes 510. The configured electrode can be software programmed according to the size of the droplet. In this example, the configured electrode 520' includes 9 (3×3) microelectrodes 510. In FIG. 5C, the droplet 541 sits on the configured electrode 520'. The droplet 541 is similar to the size of droplet 540 (FIG. 5B) for comparison purposes. In FIG. 5C, the configured electrode 520' comprises a plural numbers of cross-sectioned ground lines 511. In the present invention, the effective droplet manipulations can be achieved since the droplet 541 physically overlaps with the configured electrode 520' and the plural ground lines 511.

Figure 6A:
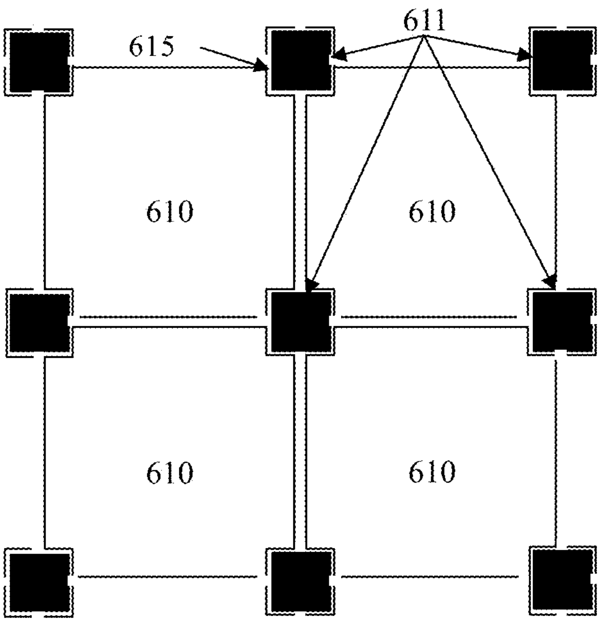
FIGS. 6A and 6B are diagrams of "ground pads" coplanar structure.
Figure 6B:
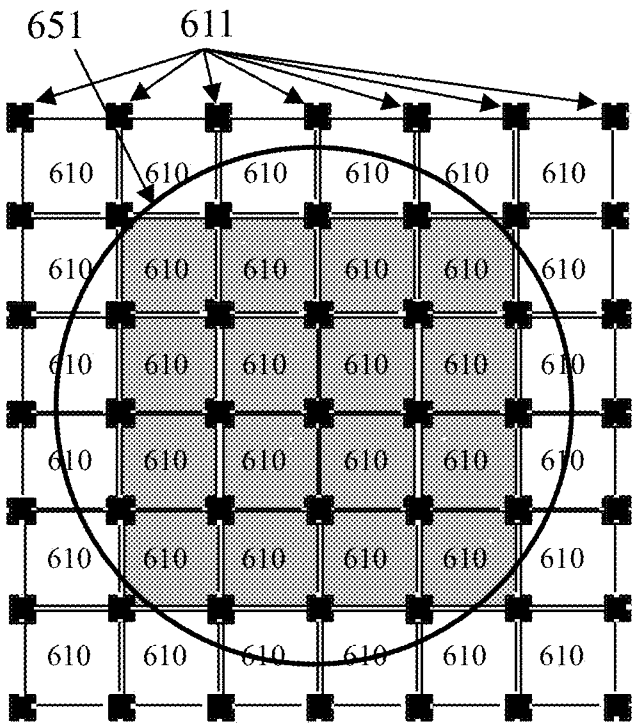

FIG. 6A illustrates another implementation of the "ground pads" coplanar microelectrode. The driving-microelectrode 610 is in the middle with the ground pads 611 at the four corners and the gap 615 between 610 and 611. Instead of the ground lines in the embodiment shown in FIG. 5A, this embodiment uses ground pads to achieve the coplanar structure. In comparison to the conventional implementation, fundamentally our invention provides a group grounding (there are 21 ground pads 611 overlap with droplet 651 in FIG. 6B) that is more reliable than the basic one-to-one relationship of conventional implementation. If one droplet depends only on one ground pad then the size of the droplet would be critical to make sure a reliable droplet manipulation because the overlap between the droplet and the ground pad is a must. A sea of ground pads don't have this constrain; regardless the size of the droplet, many ground pads would be overlapped with the droplet as shown in FIG. 6B. The driving force for the droplet is basically proportional to the charge accumulated across the biased activating electrode and the ground pad. And typically the charge accumulation is also proportional to the surface area of the electrode and ground pad. A small size ground pad will have significant degrading on the driving force unless a special treatment of the ground pad is applied to improve other physical parameters and it will complicated the fabrication processes. In our invention the group of ground pad can be easily adjusted to optimize the total surface area of the ground pads. In addition, the diving force of the droplet for a coplanar structure eventually will be balanced at around the middle point of the ground pad and the driving electrode. So there is a chance that the droplet never can reach the second ground pad and that cause an unreliable droplet operation. This is especially true for a smaller droplet. Our invention using group grounding so consistent overlaps of ground pads, microelectrodes, and droplets guarantee the reliable droplet operations. Also, in our invention the miniature microelectrode (typically is less than 100×100 $\mu m^2$) is beyond the feasibility of PCB technology and required microfabrication techniques derived from semiconductor integrated circuit manufacturing.

Figure 7A:
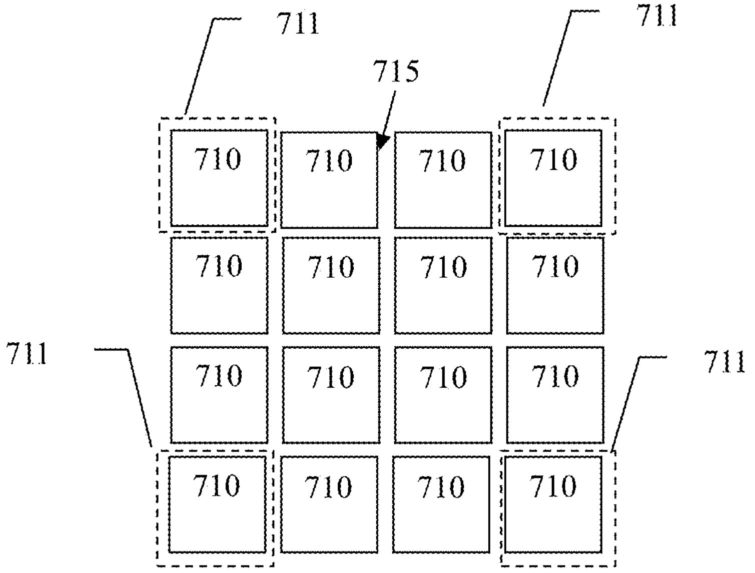
FIGS. 7A, 7B and 7C are diagrams of "programmed ground pads" coplanar structure.
Figure 7B:
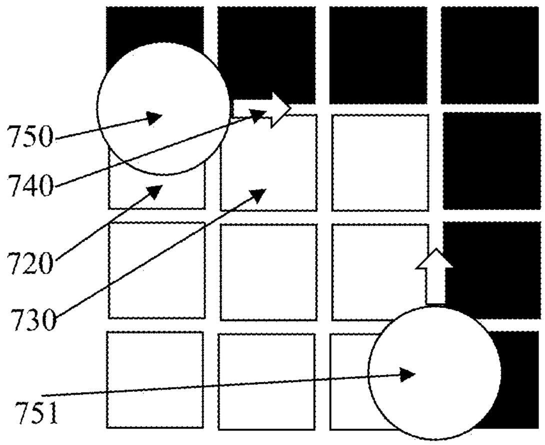

FIG. 7A illustrates another embodiment of the "programmed ground pads" coplanar microelectrode structure. There are no ground lines or ground pads on the same plate with microelectrodes. Instead, some microelectrodes are used as the ground pads to achieve a coplanar electrode structure. FIG. 7A shows 4×4 identical square microelectrodes 710 with gap 715 in between. In this embodiment, any one of the microelectrodes 710 can be configured to act as the ground electrode by physically connected to the electrical ground. In this embodiment, the microelectrodes 710 at the four corners are configured as ground electrodes 711. This invention has the advantage of group grounding vs. a one-to-one electrode and grounding structure in the conventional implementation. Also, the field-programmability and the miniature microelectrodes provide more flexibility and more granularities in the dynamic configuration of the "configured-electrodes" and the "configured-ground pads". As indicated in FIG. 7B, because of the one-to-one electrode and grounding structure in the prior art, the droplet 750 can only move on the x-axis direction and droplet 751 can only move on the y-axis direction. In this conventional coplanar structure configuration, the droplet 750 would be centered between the activated electrode 720 and the ground electrode which is marked as black because of the distribution of accumulated charges between the electrode

Figure 7C:
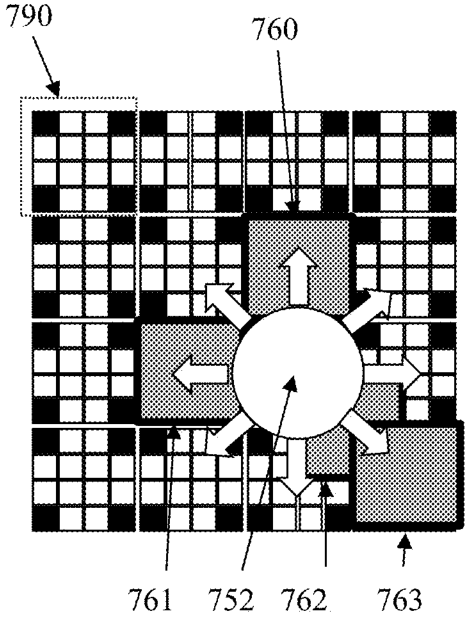

720 and the ground pads. The only way to move the droplet 750 is to deactivate electrode 720 and to activate the adjacent electrode 730; in this way, the droplet 750 will be pulled into the direction along the line as indicated by the arrow 740. In comparison, droplet 752 sits on a coplanar surface employing the EWOD microelectrode array architecture can move in any directions as indicated in FIG. 7C. When "configured-electrode" 760 is activated droplet 752 moves upward. The same thing happens, when "configured-electrode" 761 is activated droplet 752 moves leftward. And when interim "configured-electrode" 762 is activated droplet 752 moves diagonally and the activation of "configured-electrode" 763 (with the deactivation of "configured-electrode" 762) pulls droplet 752 diagonally onto "configured-electrode" 763. For the illustrating purpose, each "configured-electrode" 790 has the ground microelectrodes on the four corners but this is not a fixed layout. Interim steps including changes on the ground electrodes or the activating electrodes can be implemented for the best results of the manipulations of the droplet.

Figure 8:
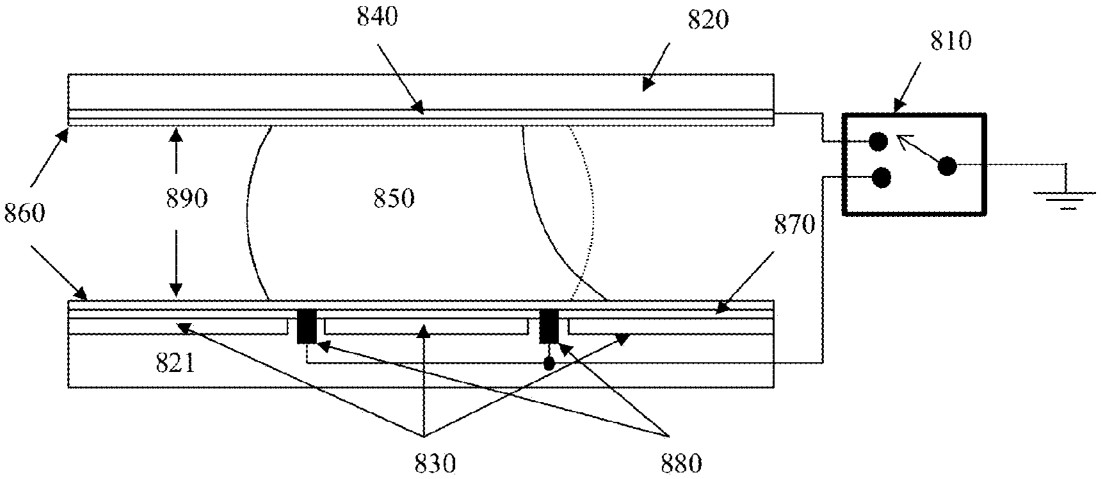
FIG. 8 is a diagram showing the hybrid plate.

In another embodiment of the present invention, the LOC device employing EWOD microelectrode array architecture technique is based on a hybrid plate structure in which the actuations can occur either in a coplanar configuration or in a bi-planar configuration. FIG. 8 illustrates a switch 810 that can be controlled to switch the EWOD microelectrode structure between the coplanar mode and the bi-planar mode. In a coplanar mode the continuous ground electrode 840 on the cover plate 820 is connected to the ground and the ground grids 880 on the electrode plate 821 is disconnected from the ground. On the other hand, in a bi-planar mode the ground grids 880 on the electrode plate 821 is connected to the ground and the ground electrode 840 on the cover plate 820 is disconnected from the ground. In another embodiment, the "ground grids" can be replaced by the "ground pads" or the "programmed ground pads" of the as described in previous sections. Also, in one embodiment, the coplanar ground schemes might not be disconnected as long as the extra grounding doesn't cause any issues in bi-planar structure operations.

Figure 9A:
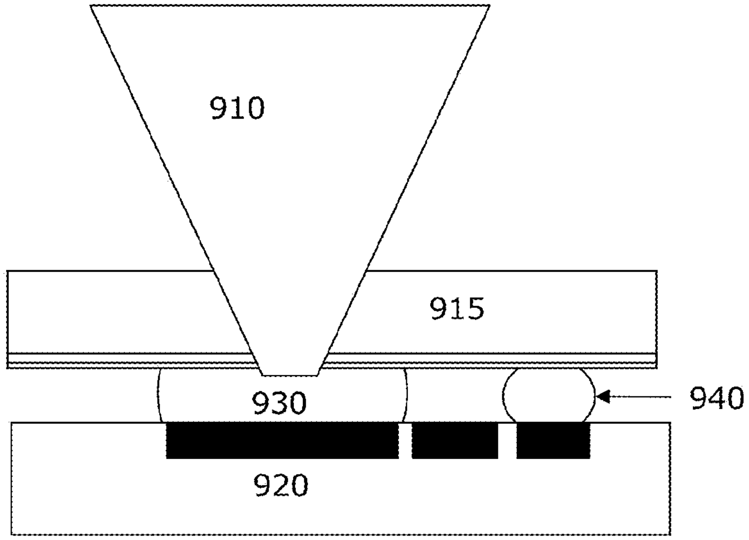
FIGS. 9A, 9B and 9C show the loading of the samples.

Disclosed herein is the droplet creating procedure in the droplet manipulation. The samples and reagents are loaded from the input ports to the reservoirs and then the liquid droplets are extruded from the reservoirs. The reservoirs can be created in the form of large electrode areas that enable the liquid droplet to access to and egress. In the EWOD-based microfluidic system, the creating procedure of the droplet is the most critical component. The system may improve the design of droplet creation procedure since the implementation of the fluidic input port is challenging due to the huge discrepancy between the scales of mini-liters sample amount and micro-liters or even nano-liters sample amount. Loading samples and reagents onto the chip requires an interface between the microfluidic device and the outside large scaled devices. As indicated in FIG. 9A, conventionally this interface is composed of an input port 910 which mounted on a through hole of the top plate 915 and a reservoir 920. Samples or reagents 930 are loaded from the input ports into reservoirs and then droplets 940 of samples or reagents are created from the reservoirs. In FIG. 9A, the sample input port 910 must appropriately match with the location of the reservoir 920 to position the sample 930 correctly. This traditional approach can lead to incorrect or messy sample loading by human error.

Figure 9B:
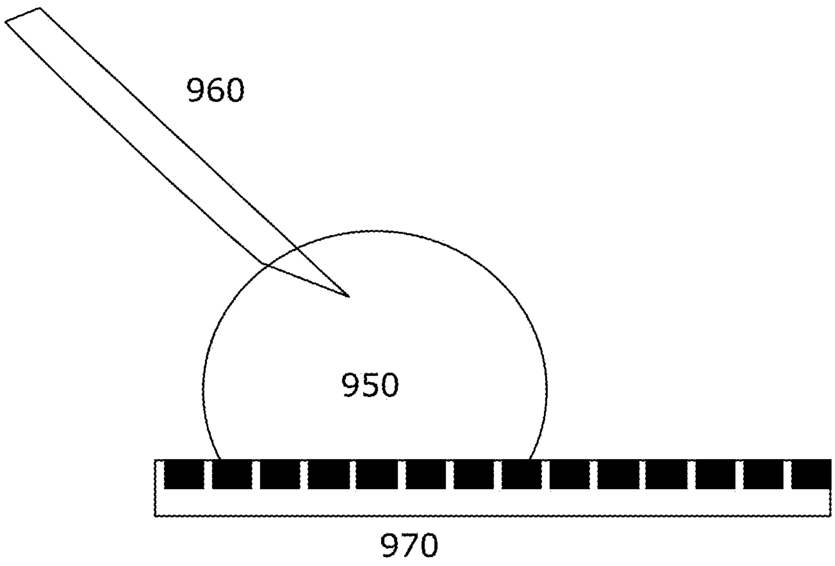
Figure 9C:
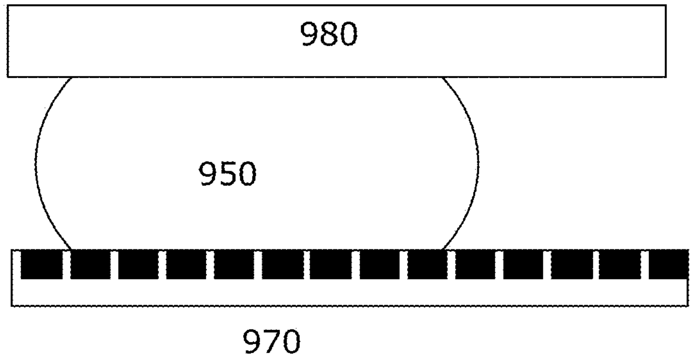

One embodiment is based on the coplanar structure that the cover can be added after the samples or reagents are loaded onto the LOC so there is no need for fixed input ports. This is especially important for the EWOD microelectrode array architecture because the field-programmability of the architecture can configure shapes, sizes and locations of the reservoirs and the fixed input ports. FIG. 9B shows the loading of the sample 950 by a needle 960 directly onto the coplanar electrode plate 970. The loading of the sample don't have to be very precise because if necessary the locations of the reservoirs can be adjusted by software programming to compensate the physical loading deviation. FIG. 9C indicates a passive cover 980 can be added into after the sample 950 is loaded into the electrodes 970.

Figure 9D:
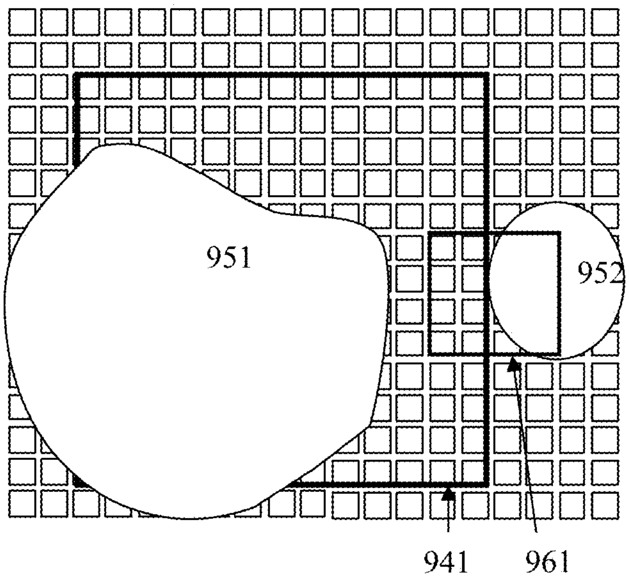
FIGS. 9D and 9E show the self-positioning of loaded samples onto the reservoir.

In another embodiment, the flexibility of the EWOD Microelectrode Array Architecture makes it possible to self-adjust the position of the loaded samples or reagents to the reservoirs. This means the need of a precisely positioned input port and the difficulties to handle the samples and reagents through the input port to the reservoir can be avoided. FIG. 9D shows the loaded samples are broken into droplet 951 and droplet 952 and both are not precisely positioned on the top of the reservoir 941. In one embodiment, droplet 952 is not necessary to be able to overlap with the reservoir 941. For a conventional LOC, it's difficult to re-position the droplet 952 into the reservoir 941.

Figure 9E:
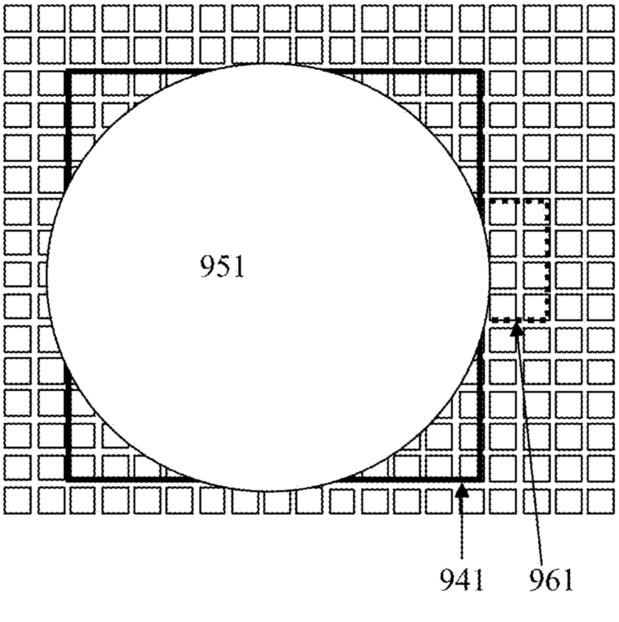
Figure 10:
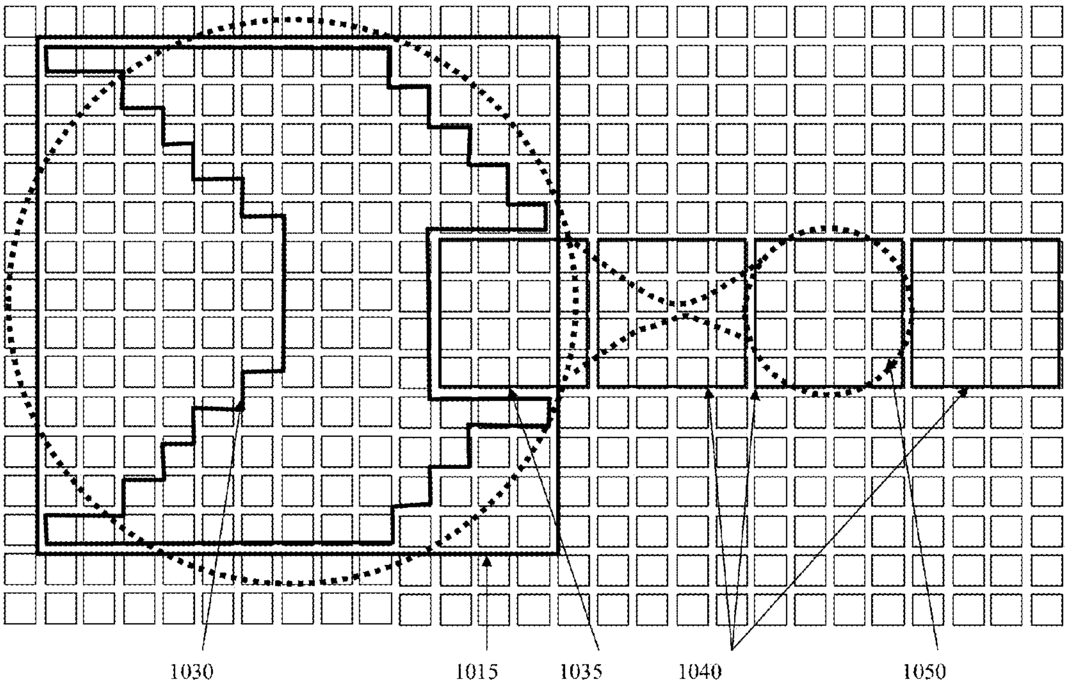
FIG. 10 is a diagram showing the creation of droplet under EWOD Microelectrode Array Architecture.

IN one embodiment, the self-positioning can be done even if the sample droplet 952 is loaded away from the reservoir 941. This can be achieved by activating an interim configured-electrode 961 to pull the droplet 952 to overlap with the reservoir 941. Next, deactivate the interim configured electrode 961 and activate the reservoir 941. In FIG. 9E, the sample droplet 953 can be correctly positioned inside the reservoir 941. 9E FIG. 10 represents the droplet creation procedure under the EWOD Microelectrode Array Architecture. In the conventional procedure, special shaped reservoir 1030 and an overlapped electrode 1035 must present in order to create droplets. In the current invention, the overlapped electrode 1035 does not necessarily be present. The shape of the reservoir 1030 can be a square-shaped reservoir 1015 and don't need an overlapped electrode 1035. In another embodiment, the shape of the reservoir 1015 can be any other shape depending on the design needs by designing the array of the microelectrodes. As shown in FIG. 10, the creation of the droplet refers to the process of extruding the droplet 1050 out from the square-shaped reservoir 1015. To start the droplet creation procedure, interim electrode 1030 is activated first as the pull-back electrode and then another interim electrode 1035 is activated to extrude the liquid. Subsequently, through the activation of adjacent serial configured-electrodes 1040 by extruding a liquid finger from the reservoir 1015 and eventually creating droplet 1050. Each of the configured-electrodes 1040 is composed of a configured 4×4 microelectrode square. In one embodiment, the dimensions of the configured-electrodes 1040 can be in a range from tens of micrometers to several mini-meters but not limited to this range. The shape of the configured-electrodes can be square or other shapes. In one embodiment, the reservoirs can be square, round or special-shaped.

Figure 11A:
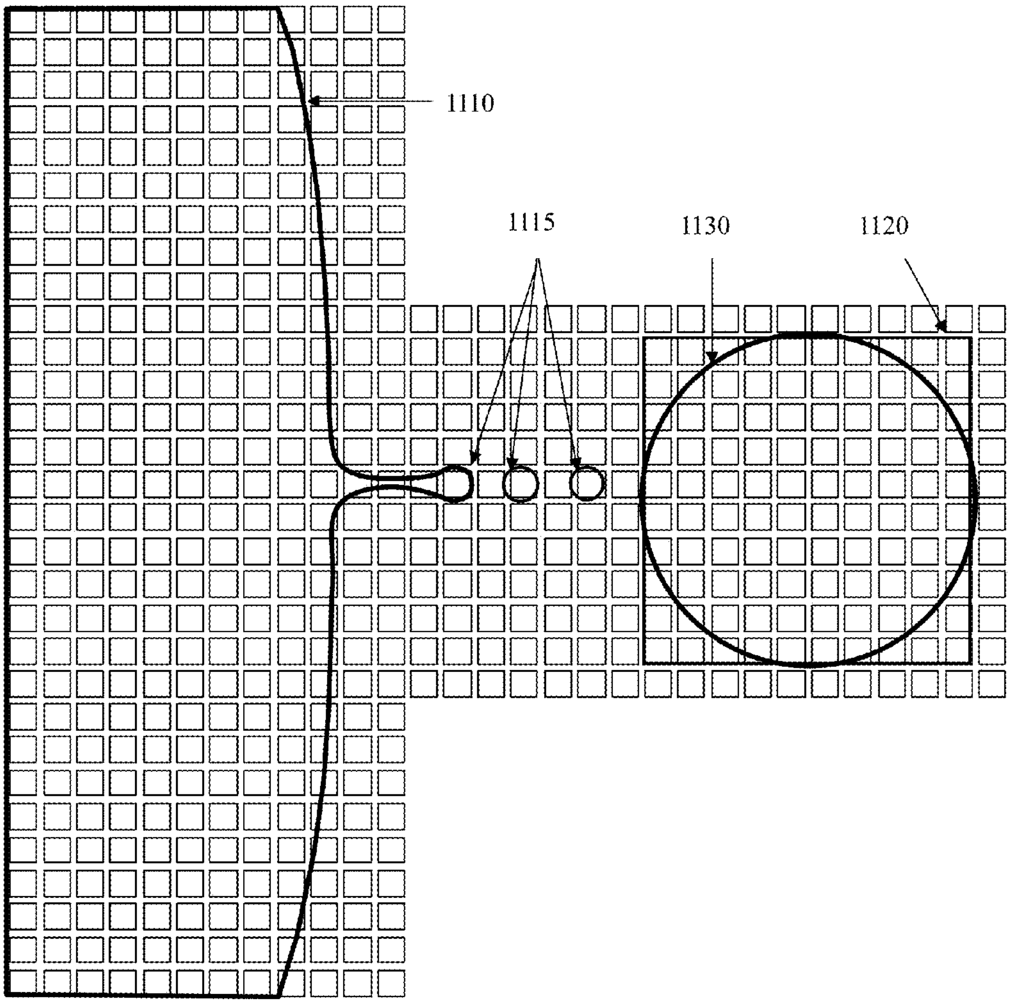
FIG. 11A is a diagram showing the droplet creating using droplet aliquots technique.

FIG. 11A illustrates the embodiment of the droplet aliquots creation procedure. By manipulating the microelectrodes, the configured electrodes 1120 can be activated. Each small droplet 1115 is about the size of the configured electrode that can be extracted from the reservoir 1110. The configured electrodes 1120 comprising a group of microelectrodes are therefore activated to collect the desired amount of droplets as shown in FIG. 11A. Conventionally, droplet sizes are approximated to the sizes of the electrodes and a more precise way to control the volumes of the droplets doesn't exist. In the current droplet aliquots creation system it can be used to do more precise control of the volumes of the droplets. Also, in another embodiment, the volume of the bigger droplet 1130 can be measured to count the number of smaller droplets 1115 created from droplet 1130.

Figure 11B:
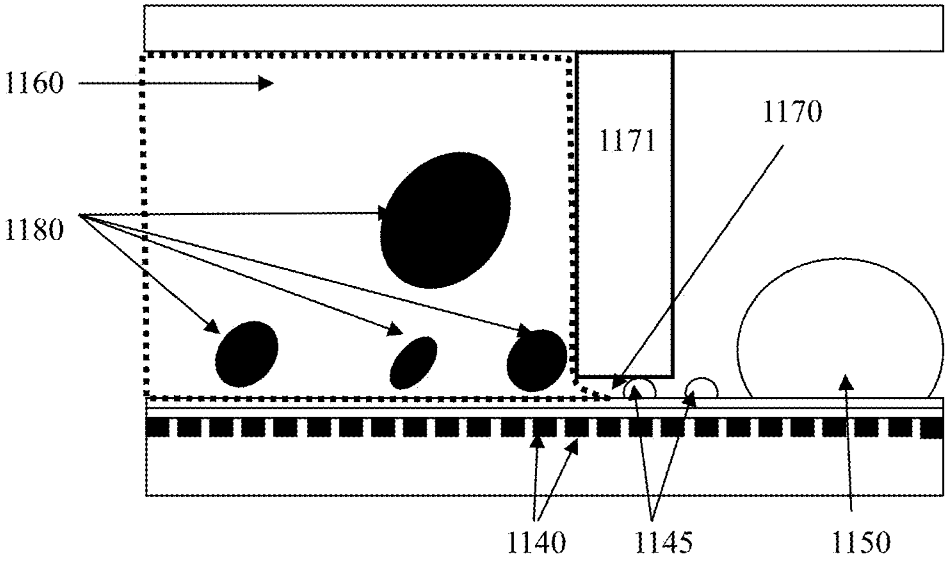
FIG. 11B is a diagram showing the sample preparation by droplet aliquots technique.

FIG. 11B illustrates another embodiment of the sample preparation using droplet aliquots technique. One of the common sample preparation steps is the removing of blood cells from the full blood to get plasma for the immunoassay. As shown in FIG. 11B, using the droplet aliquots technique through microelectrodes 1140 to create smaller droplet which is too small to carry some or any of the blood cells 1180 then move the small droplets 1145 through the small-scaled vertical gap 1170 to form a desire droplet 1150. The combination of the droplet aliquots technique and the small gap 1170 can efficiently move the small droplets 1145 from the reservoir/droplet 1160 through the channel 1170 to form a bigger droplet 1150 while blood cells 1180 are blocked. The physical obstacle here is used to help droplet aliquots technique and it could be different shapes than square to create smaller droplet with microelectrode. It is not used as the main cause of the removal of the blood cells. By using droplet aliquots technique, this sample preparation invention not only can remove the particles from the droplet but also can prepare the right-sized droplets for diagnostic test.

Figure 12:
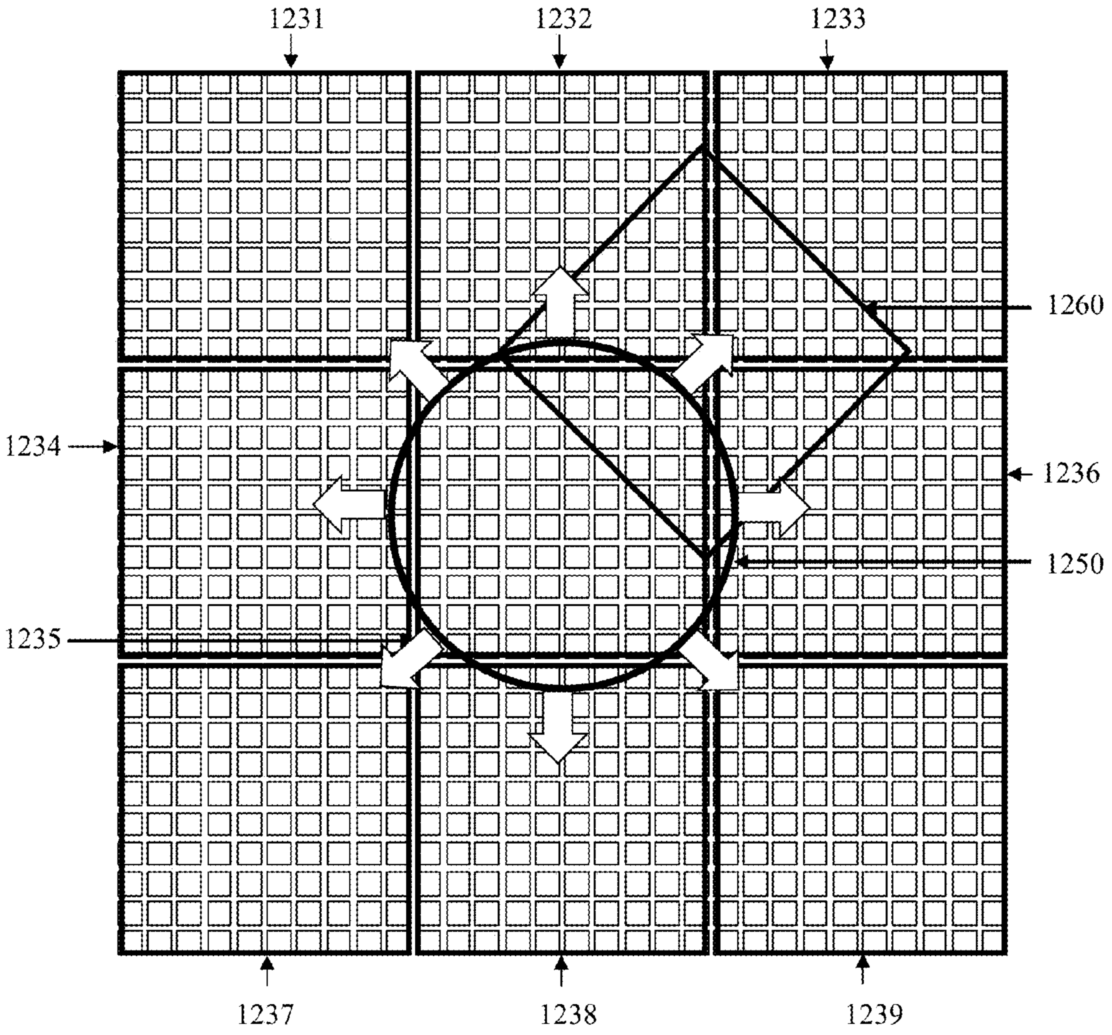
FIG. 12 is a diagram showing the transportation of droplet based on the EWOD Microelectrode Array Architecture and the ability being actuated in all directions.

FIG. 12 shows the droplet transportation using the EWOD microelectrode array architecture. In one embodiment, there are 9 adjacent configured electrodes 1231. 1232, to 1239. Each of the configured electrodes is composed of a configured 10×10 microelectrode squares. The droplet 1250 lies on top of the center configured-electrode 1235. In one embodiment of the current system, the droplet can be transported either in the north-south or east-west directions by the manipulations of the configured electrodes. For example, by activating configured electrode 1234 and deactivating configured electrode 1235, droplet 1250 can travel from configured electrode 1235 onto configured-electrode 1234. In another embodiment, the droplet 1250 can be transported in a diagonal direction according to users' needs. For example, droplet 1250 can be transported diagonally from configured-electrode 1235 onto anyone of configured-electrodes 1231, 1233, 1237, or 1239, even though these four configured-electrodes 1231, 1233, 1237, and 1239 have no physical overlapping with droplet 1250. In order to move the droplet 1250 diagonally, one embodiment is to activate configured electrode 1260 as the interim step, and then subsequently activate the desired configured electrode 1233 and then deactivate the interim configured electrode 1260 so therefore so to move the droplet 1250 diagonally into the desired configured electrode 1233. As shown in FIG. 12, the droplet 1250 can be moved in all eight directions in a square-electrode setting, including north-south, east-west, north-west, north-east, south-east or south-west directions. In one embodiment, the sizes of the interim configured electrode 1260 can include multiple microelectrodes according to users' needs. In another embodiment, the shapes of the interim configured electrode 1260 can be varied to facilitate the droplet transportation. Still in another embodiment, the transportation direction of droplet 1250 is not limited to the eight directions. Even the adjacent configured electrode falls outside of the eight directions an interim configured electrode can be created and activated to transport the droplet into desired location.

Figure 13A:
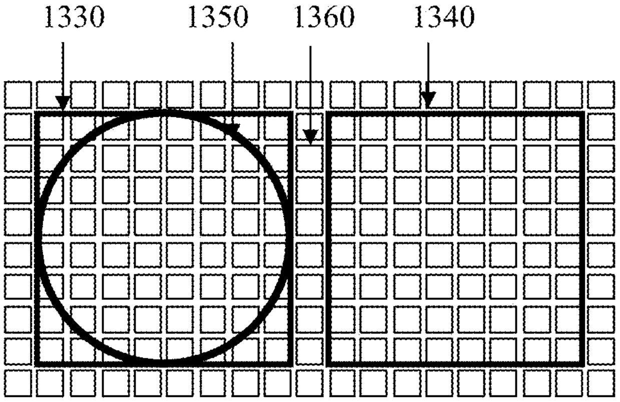
FIGS. 13A, 13B and 13C are diagrams showing the transportation of a droplet using interim bridging technique based on the EWOD Microelectrode Array Architecture.
Figure 13B:
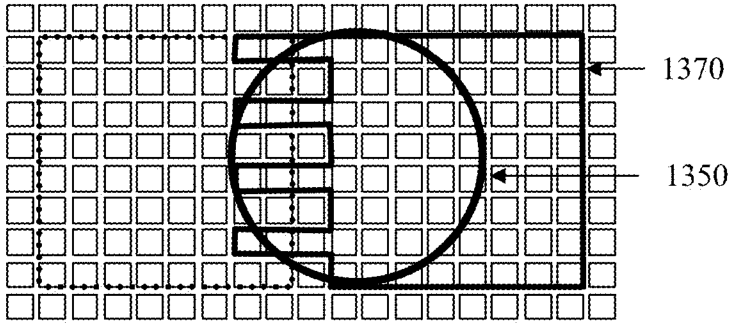
Figure 13C:
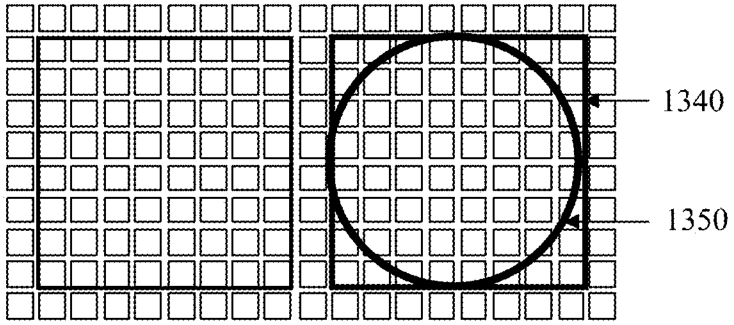

Another embodiment in the droplet transportation and movement of the droplet with the EWOD Microelectrode Array Architecture including the Interim bridging technique is illustrated in FIGS. 13A-13C. Through droplet cutting and evaporation, the droplet can be too small to be actuated reliably by the electrodes. FIG. 13A shows two configured-electrodes 1330, 1340, respectively, which are separated by a gap 1360. The droplet 1350 sits on the left-side configured-electrode 1330. The gap 1360 between the two configured-electrodes 1330 and 1340 is wide enough to segregate the two configured-electrodes 1330, 1340. The droplet 1350 sits on the left-side configured-electrode 1330 would not touch the next adjacent configured-electrode 1340.

In FIG. 13A, the droplet 1350 cannot be moved directly from electrode 1330 to next adjacent electrode 1340, since there is no physical overlapping between droplet 1350 and electrode 1340 to change the surface tension. This problem is often seen in conventional EWOD transportation. FIG. 13B illustrates one embodiment of the transportation of the droplet 1350 from FIG. 13A into the desired configured-electrode 1340. In this procedure, the microelectrodes covered by the "toothed" area 1370 are activated. The toothed configured electrode 1370 covers partially the left-side configured electrode 1330, gap 1360, and the entire adjacent configured-electrode 1340. As shown in FIG. 13B, the "toothed" configured-electrode 1370 has a physical overlap with droplet 1350. So trigger the activation of configured-electrode 1370 will move the droplet 1350 onto the top of configured electrode 1370. FIG. 13C illustrates the completion of the droplet transportation to the desired configured electrode 1340. After the droplet 1350 is transported to the desired configured-electrode 1370, the "toothed" configured-electrode 1370 is de-activated. The configured-electrode 1340 is then activated to position and locate the droplet 1350 into the desired square-shaped electrode 1340.

Figure 14A:
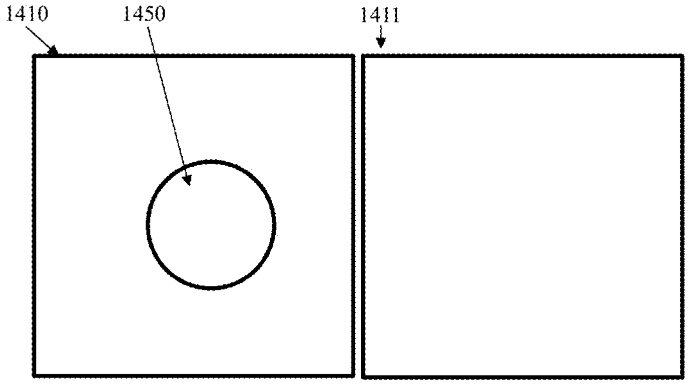
FIGS. 14A and 14B are diagrams showing the electrode column actuation under the EWOD Microelectrode Array Architecture.
Figure 14B:
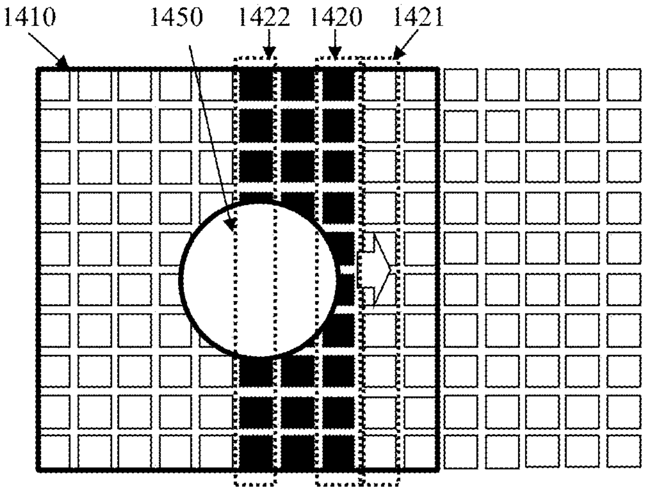

Another embodiment in droplet transportation and movement with the EWOD Microelectrode Array Architecture includes the electrode column actuation manipulation. Through droplet cutting and evaporation, the droplet can be too small to be actuated reliably by the electrodes. As illustrated in FIG. 14A, the droplet 1450 is much smaller than the electrode 1410 and no physical overlapping between the droplet 1450 and the adjacent electrode 1411. In this situation even if electrode 1411 is activated the droplet 1450 still cannot be moved into electrode 1411 so the droplet can be easily stuck inside the system. One embodiment to effectively flush out the stuck droplets is to use the electrode column actuation. In FIG. 14B, the actuating electrodes are arranged into columns to perform the electrode column actuation. In one embodiment, the ach configured electrode column 1420 is composed of 1×10 microelectrodes. Three configured electrode columns are grouped together to perform the electrode column actuation as marked black in FIG. 14B. The default column width is one microelectrode but can be other numbers depending on the applications. In another embodiment, the most effective electrode column actuation with a group of columns has the width no less than the radius of the droplet 1450. Still in another embodiment, the length of the column depends on the application and normally the longer the better.

Figure 14C:
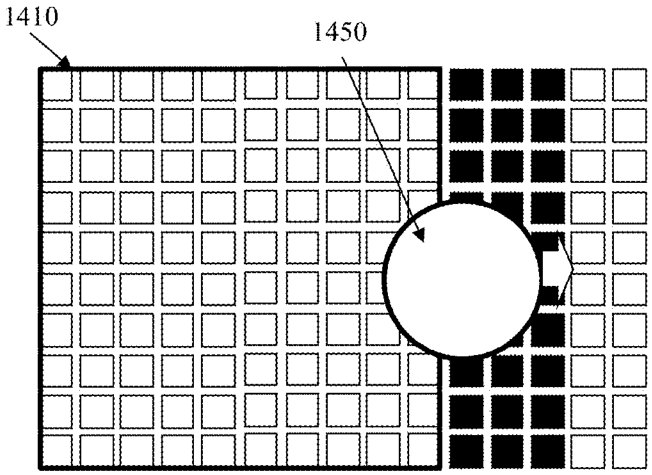
FIG. 14C is a diagram showing that while the activated configured electrode columns keep moving to the right and eventually move out of the configured-electrode, and the small droplet is also carried out of configured-electrode.

FIG. 14B shows how the three-configured-electrode column can be manipulated to facilitate the droplet transportation. The configured electrode column 1421 before the leading configured-electrode column 1420 can be activated, and the tailing configured-electrode column 1422 is deactivated. In this embodiment, regardless the sizes of the droplets, the three configured electrode column provides a maximum effective length of the contact line. As a result, the droplet 1450 can be moved efficiently and smoothly because the capillary force on the droplet 1450 is consistent and maximized. The droplet 1450 can be moved in a much lower driving voltage than the conventional EWOD droplet operations. This electrode column actuation technique can be used to transport droplets with smooth movement in much lower driving voltage. Also, because the consistent capillary force of this technique, it can be used to do the control of the droplet speed especially in low speed situations by advancing the configured-electrode column in low speed. In another embodiment, under the marginal driving voltages, the electrode column actuation can be applied to actuate the droplets. Still in another embodiment, slowly but steadily moving DI water droplet (1.1 mm diameter) in 10 cSt silicon oil has been observed below 8 Vp-p 1 k Hz square driving voltage with 80 μm gap. Still in another embodiment, the length of the configured electrode column can be configured to be the full length of the LOC. A single sweep of the electrode column actuation can wash out all dead droplets in the LOC. FIG. 14C shows that while the activated configured electrode columns (marked as black) keep moving to the right and eventually move out of the configured-electrode 1410, the small droplet 1450 is also carried out of configured-electrode 1410.

Figure 15A:
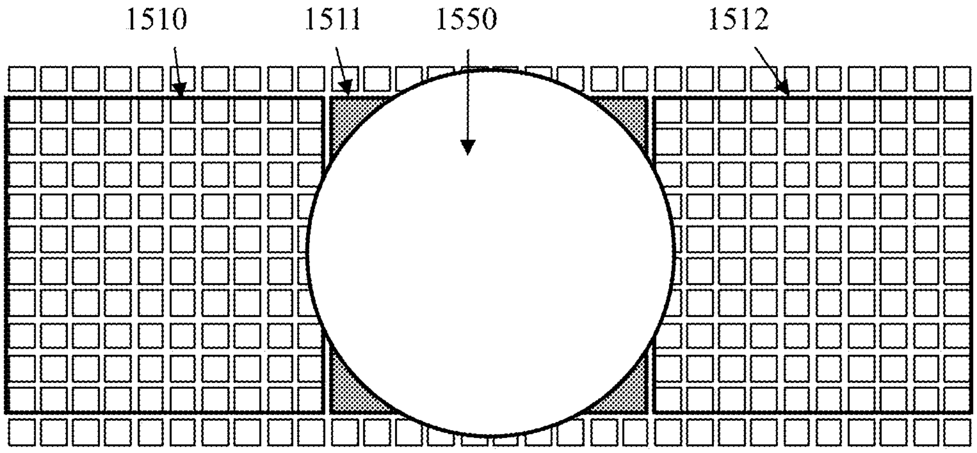
FIGS. 15A, 15B and 15C are diagrams showing the cutting of a droplet based on the EWOD Microelectrode Array Architecture.
Figure 15B:
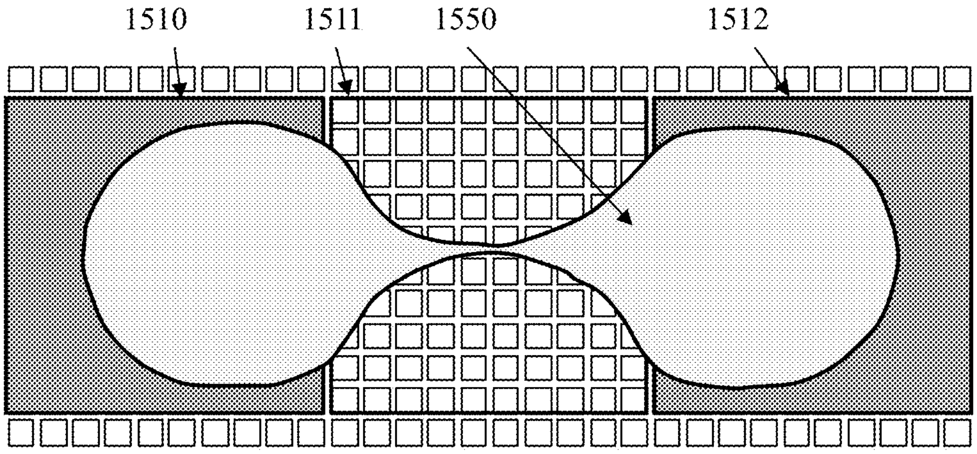
Figure 15C:
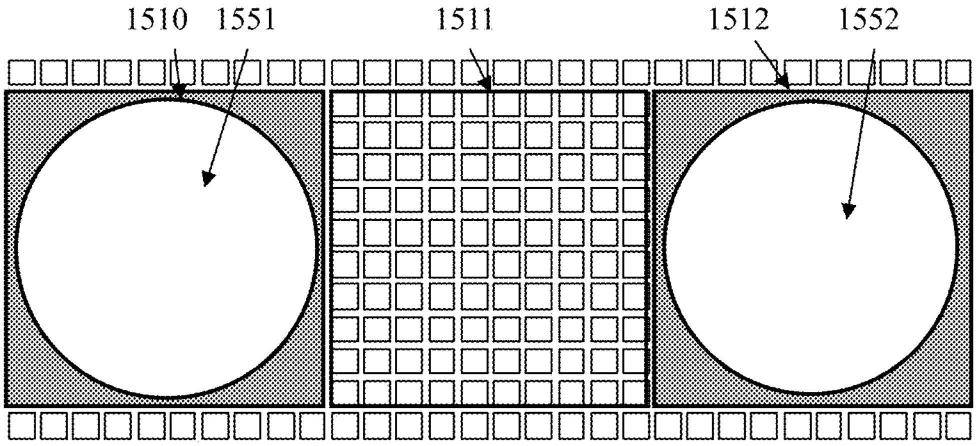

FIGS. 15A-15C show one embodiment for performing a typical three-electrode cutting of a droplet under the EWOD microelectrode array architecture. FIG. 15A shows three configured electrodes 1510, 1511, 1512 line together horizontally. The droplet 1550 ready to be cut sits on the center configured electrode 1511. In FIG. 15A, the configured electrode 1511 is activated to hold the droplet 1550. The droplet 1550 overlaps with the portions of adjacent configured electrodes 1510 and 1512. FIG. 15B shows the droplet cutting stage by activating the configured electrodes 1510, 1512 at the same time and deactivate the configured electrode 1511. By the electrode manipulation the droplet 1550 is been pulled toward left-right directions to electrodes 1510 and 1512. In one embodiment, the hydrophilic forces induced by the two outer configured-electrodes 1510 and 1512 stretch the droplet while the hydrophobic forces in the center pinch off the liquid into two daughter droplets 1551' and 1552' as shown in FIG. 15C.

Figure 16A:
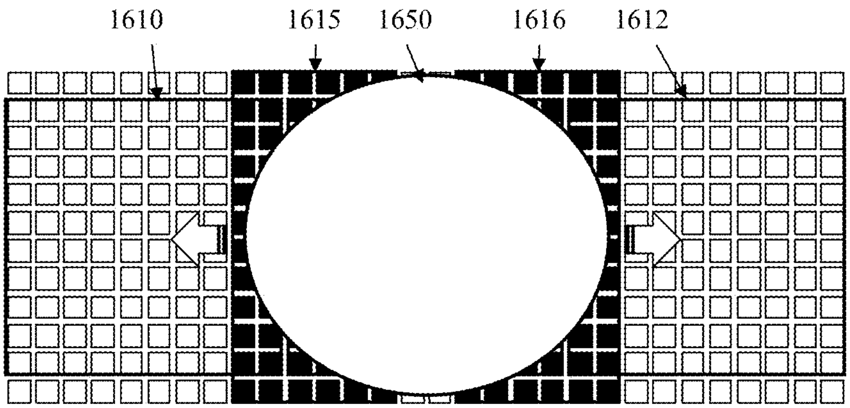
FIGS. 16A, 16B and 16C are diagrams showing the precise cutting of a droplet based on the EWOD Microelectrode Array Architecture.
Figure 16B:
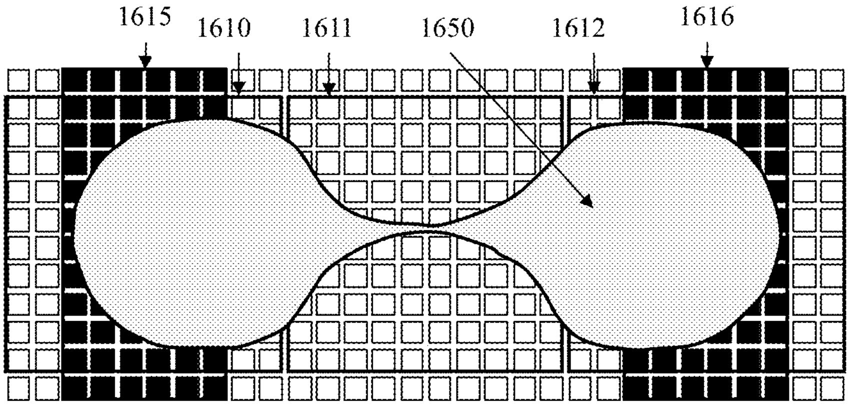
Figure 16C:
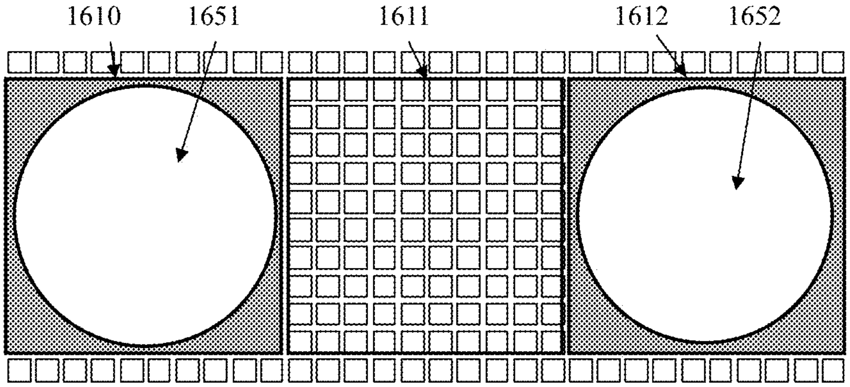

One embodiment of the droplet cutting is illustrated in FIGS. 16A-16C. FIGS. 16A-16C shows three configured electrodes 1610, 1611, 1612 line together horizontally. The droplet 1650 ready to be cut sits on the center configured electrode 1611. Instead of using outer two configured-electrodes 1610 and 1612 to cut the droplet 1650, the electrode column actuation technique is used to slowly but firmly pull the droplet 1650 toward configured-electrodes 1610 and 1612 as shown in FIG. 16A. In this embodiment, two configured electrode columns 1615 and 1616 (marked as black in FIG. 16A) are used and activated to pull the droplet apart. Each of the two configured electrode columns includes five columns of electrodes. FIG. 16B illustrates the two electrode columns keep moving apart by advancing one microelectrode column each over a time, so to slowly pull and move the droplet 1650 toward opposite direction. The hydrophilic forces induced by the two electrode columns 1615 and 1616 are applied to stretch the droplet 1650. When electrode columns 1615 and 1616 reach the outer edges of the configured-electrodes 1610 and 1612, deactivate these configured-electrode columns 1615 and 1616. The configured-droplets 1610 and 1612 are activated to pinch off the liquid into two sub-droplets 1651 and 1652 as shown in FIG. 16C.

Figure 17A:
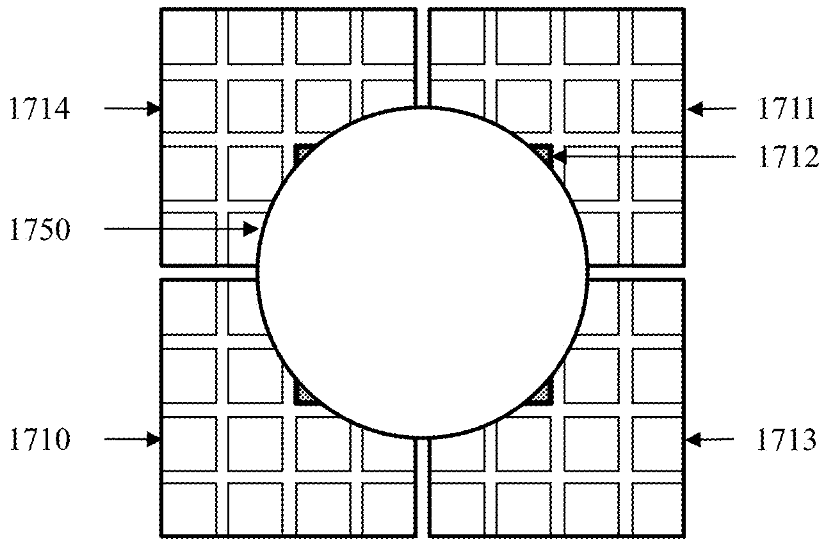
FIGS. 17A, 17B, 17C and 17D are diagrams showing the diagonal cutting of a droplet based on the EWOD Microelectrode Array Architecture.
Figure 17B:
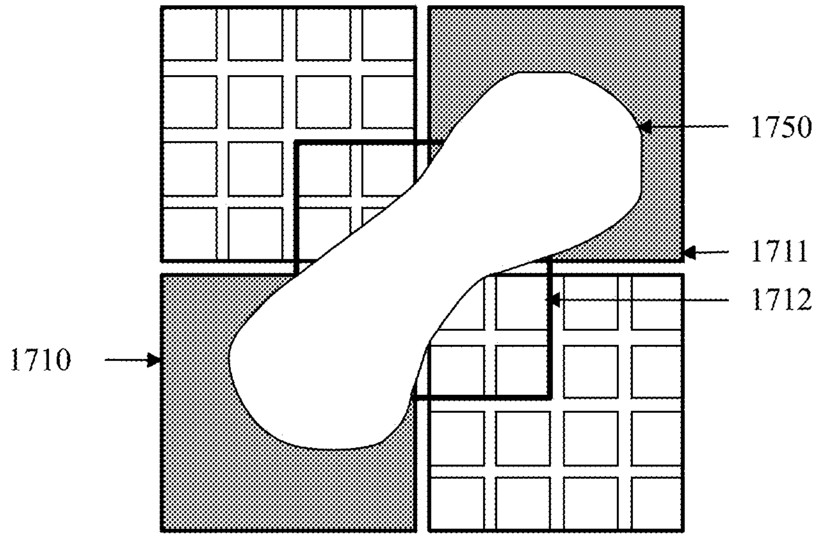
Figure 17C:
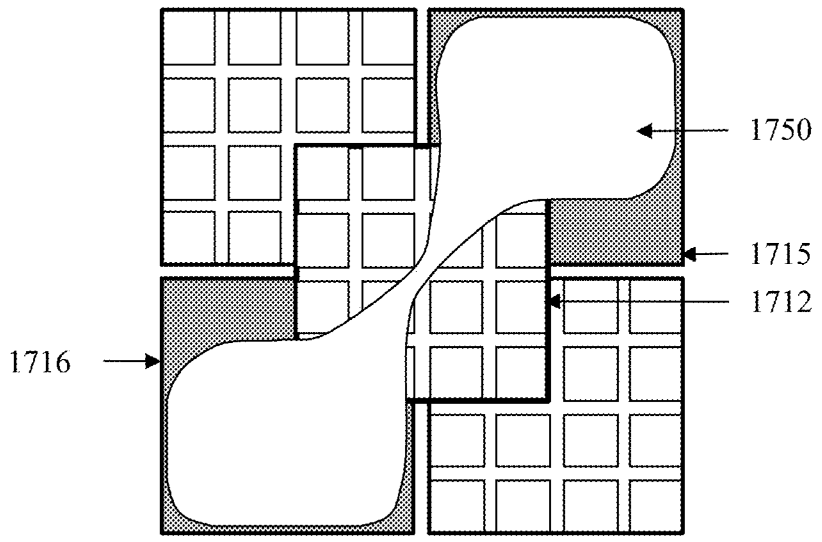

FIGS. 17A-17C illustrates the embodiment of performing a diagonal cutting performed with the EWOD microelectrode array architecture. The diagonal cutting starts with moving the droplet to be cut onto a interim configured-electrode 1712 which is centered at the joint corner of the four configured-electrodes 1710, 1711, 1713 and 1714 in FIG. 17A. The moving of the droplet 1750 can be achieved by activating the electrodes. After the droplet completely centered at the joint corner of the four configured-electrodes, the interim configured-electrode 1712 is deactivated and configured electrodes

Figure 17D:
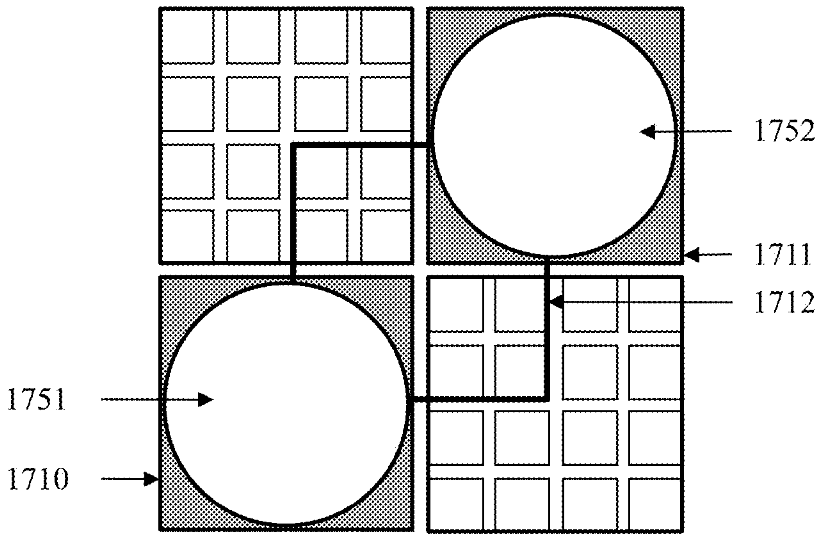

1710, 1711 are activated so to stretch the droplet 1750 into a liquid column as indicated in FIG. 17B. To pinch off the liquid into two daughter droplets, the inner corners of configured electrodes 1710 and 1711 are deactivated to produce the necessary hydrophobic forces in the middle of droplet 1750. FIG. 17C shows the L-shaped interim configured electrodes 1715 and 1716 are activated to further stretches the droplet 1750 with only a thin neck in-between. The hydrophobic forces in the middle subsequently help to pinch off droplet 1750 into two sub-droplets 1751 and 1752. Finally, configured-electrodes 1710 and 1711 are activated again to center-position the sub-droplets 1751 and 1752 as illustrated in FIG. 17D.

The diagonal cutting of the droplet cutting is efficient and effective because the two pulling electrodes possess longer length of the electrode contact. The pulling capillary forces on the droplet are greater than the conventional cutting. As a result, the cutting voltage can be reduced and more uniform droplet cutting can be achieved. For a conventional cutting, it may require voltages that exceed the saturation voltage (i.e., voltage corresponds to contact angle saturation). To obtain more reliable EWOD droplet operations, extra care must be used in setting the conditions for uniform splitting so not to exceed the saturation voltage. Thus, the diagonal cutting is a good candidate for droplet cutting to keep the cutting voltages below the saturation voltage. Also, the diagonal cutting is less constrained by the droplet size. A conventional cutting requires a bigger droplet that can be physically overlapped with the outer two electrodes. The diagonal cutting can virtually cut any size of droplet.

Figure 18A:
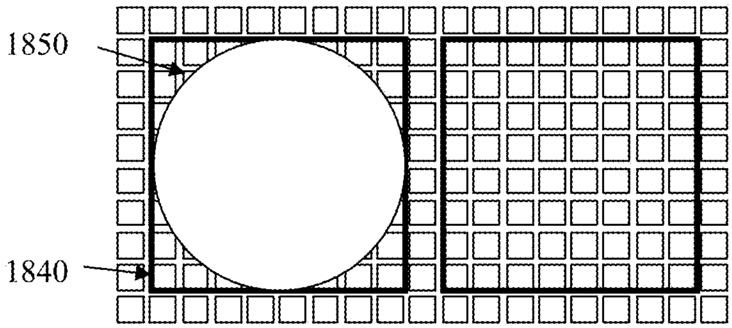
FIGS. 18A, 18B and 18C are diagrams showing the coplanar cutting of a droplet based on the EWOD Microelectrode Array Architecture.
Figure 18B:
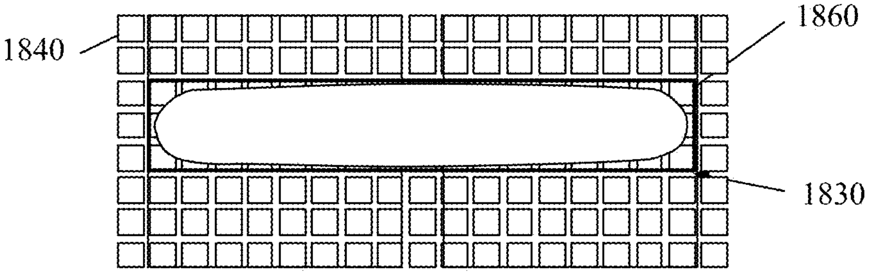
Figure 18C:
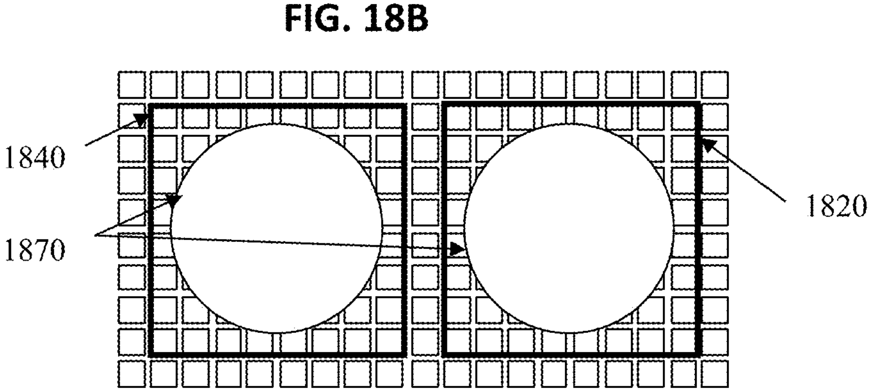

In one embodiment, the droplet cutting procedure can be applied to the coplanar structure when the droplet cutting is performed on the open surface under the EWOD Microelectrode Array Architecture. FIGS. 18A-18C illustrate the droplet cutting procedure on an open surface under the EWOD Microelectrode Array Architecture. FIG. 18A illustrates a droplet 1850 sits on the left-side configured electrode 1840. The droplet 1850 will be cut into two sub-droplets 1870 as shown on FIG. 18C. The droplet cutting procedure generally involves the next two procedures. First, stretch the droplet-to-be-cut 1850 into a thin liquid column 1860 by activating the configured-electrode 1830 under appropriate voltages. This can be seen in FIG. 18B. Such "thin" liquid column generally refers to the liquid column with smaller width than the starting droplet diameter. Next, activate the two preselected configured-electrodes 1840 and 1820 to cut and to center-position droplets 1870 into these two configured-electrodes 1840 and 1820 as shown in FIG. 18C. The key for the coplanar cutting is to have enough overlaps between the droplet and the outer two configured-electrodes to have enough capillary force to overcome the curvature of the droplet to perform the cutting. In one embodiment, a passive cutting is presented when the liquid column 1860 is cut into multiple droplets by hydrodynamic instability. In another embodiment, both the passive and the active cutting are employed. While the droplet is stretched into a thin liquid column, either the passive force or active force can be employed to break the starting droplet into two smaller droplets. When use the passive force, the calculation of the length of liquid column is important. When use active force, the optimized length is not important. Either passive cutting or active cutting, at the final step of the cutting procedure, configured electrodes 1840 and 1820 are normally activated in order to position the droplets into the desired configured-electrodes. In another embodiment, either an active or a passive cutting procedure is performed under the open surface structure by using EWOD Microelectrode Array Architecture. FIG. 18C illustrates the completion of cutting when the droplet 1850 is cut into two sub-droplets 1870.

Figure 19A:
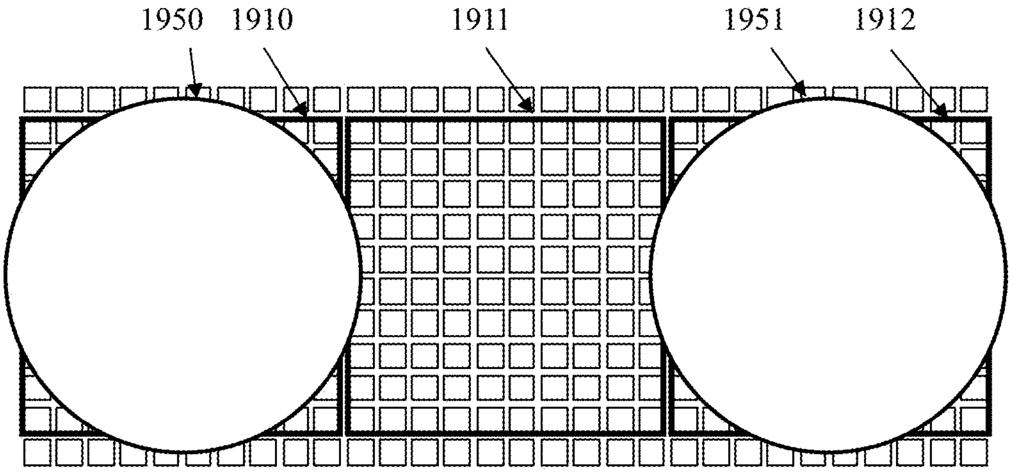
FIGS. 19A and 19B are diagrams showing the merge/mixing of two droplets based on the EWOD Microelectrode Array Architecture.
Figure 19B:
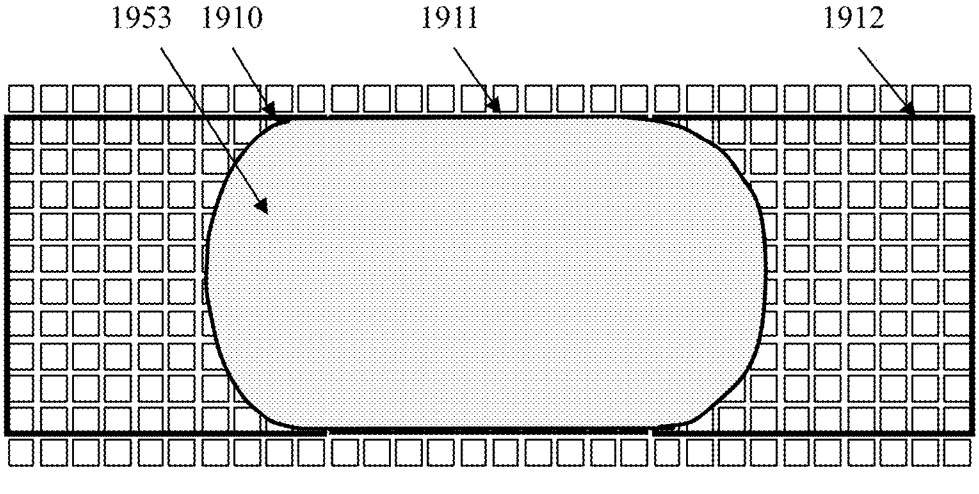

One embodiment of performing a basic merge or mixing operation under the EWOD microelectrode array architecture as shown in FIGS. 19A-19B. In the present discussion, the terms merge and mixing have been used interchangeably to denote the combination of two or more droplets. This is because the merging of two droplets does not in all cases directly or immediately result in the complete mixing of the components of the initially separate droplets. In FIG. 19A, two droplets 1950 and 1951 are initially positioned at each of the corresponding configured electrodes 1910 and 1912, respectively, and separated by at least one intervening configured electrode 1911. Both droplets 1950 and 1951 have partial overlaps with the central configured electrode 1911. As shown in FIG. 19B, by deactivating the two configured electrodes 1910 and 1912 and activating the central configured electrode, the droplets 1950 and 1951 can be moved toward each other across the central configured-electrode 1911 and then merged into a bigger droplet 1953.

In EWOD Microelectrode Array Architecture, mixing of analytes and reagents is a critical step. The droplets act as virtual mixing chambers, and mixing occurs by transporting two droplets into the same electrode. The ability to mix liquids rapidly while utilizing minimum area greatly improves the throughput. Conventionally, an effective mixing of droplets might need eight (2×4) electrodes to move the mixed droplet in certain way among these eight electrodes to speed up the mixing. A way to mix the droplets efficiently without the requirements of using big real estate for the mixing operation is highly desirable. However, as microfluidic devices are approaching the sub nano-liter regime, reduced volume flow rates and very low Reynolds numbers can make mixing liquids difficult to achieve under reasonable time scales. Improved mixing relies on two principles: the ability to create turbulent flow at such small scales, or alternatively, the ability to create multilaminates to achieve fast mixing. The EWOD Microelectrode Array Architecture can provide active droplet-based mixing at least an order of magnitude faster than passive mixing by diffusion.

Figure 20A:
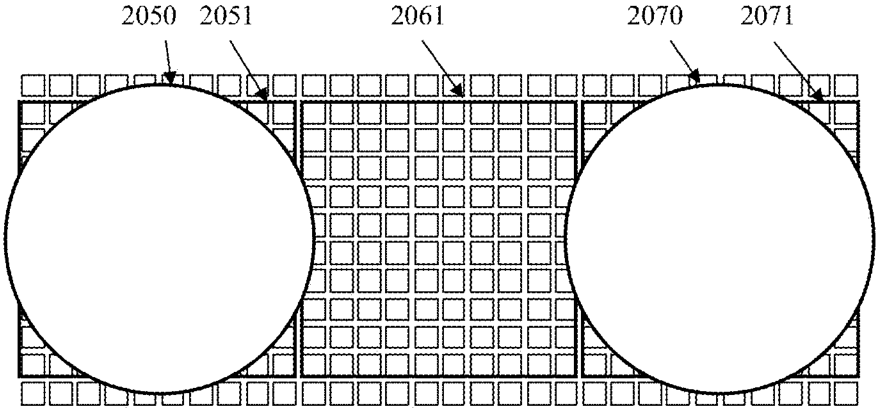
FIGS. 20A, 20B, and 20C are diagrams showing the quick mixing of droplets by uneven-geometry movements based on the EWOD Microelectrode Array Architecture.
Figure 20B:
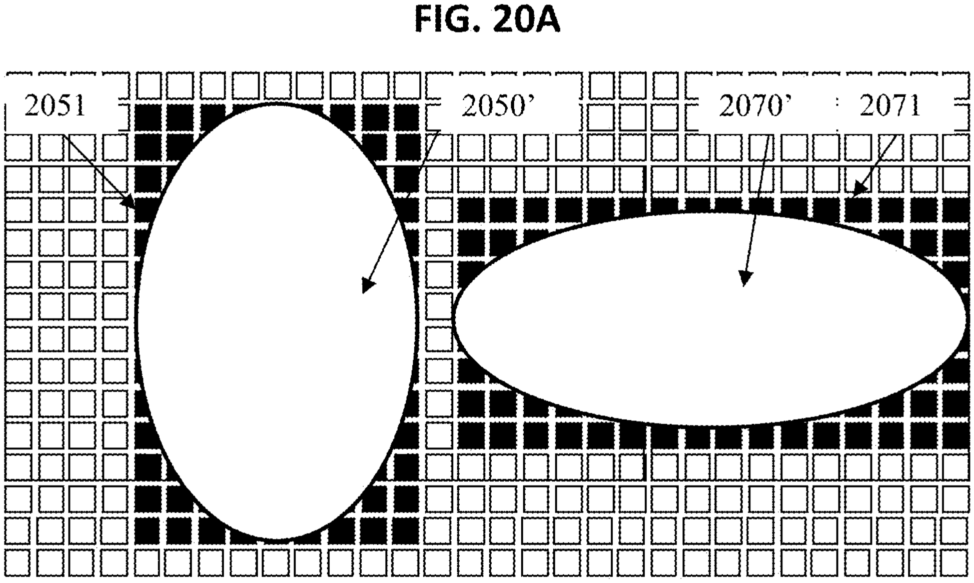
Figure 20C:
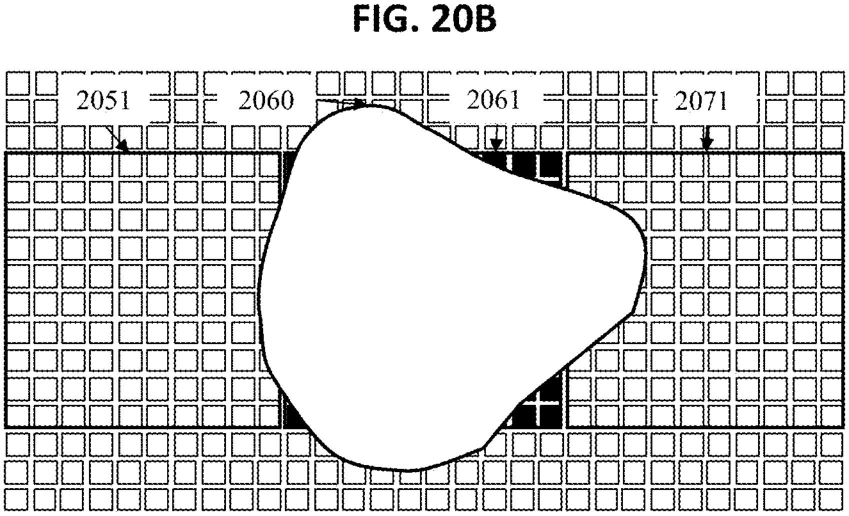

FIGS. 20A-20C illustrate the active mixing procedure of the droplet manipulation by uneven-geometry movement to create turbulent flow based on the EWOD Microelectrode Array Architecture. As shown in FIG. 20A, the droplets 2050, 2070 can be deformed to desired shapes by the manipulation of the configured electrodes. By activating the configured electrodes 2051 and 2071 as shown in FIG. 20B, the droplets are shown as droplet 2050' and droplet 2070'. The center configured electrode 2060 then is activated in order to pull the droplets 2050', 2070' into the mixing configured electrode 2060 (marked in black) as shown in FIG. 20C. In FIG. 20B, the black areas indicate two activated configured electrodes 2051 and 2071. These activated electrodes can apply to deform and pull these two droplets 2050' and 2070' into the center configured electrode 2060. This interim activating step shown in FIG. 20B also helps a smooth mixing movement of the two droplets. The shapes of the black area and the deformed droplets in FIGS. 20B-20C are for illustration purposes only. In another embodiment, the shapes can be any types based on the needs.

Figure 21A:
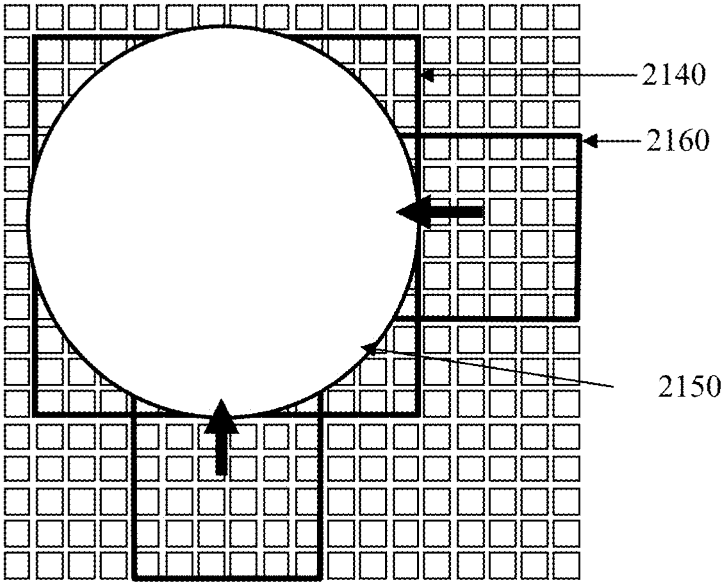
FIGS. 21A and 21B are diagrams showing the uneven back-and-forth mixer based on the EWOD Microelectrode Array Architecture.
Figure 21B:
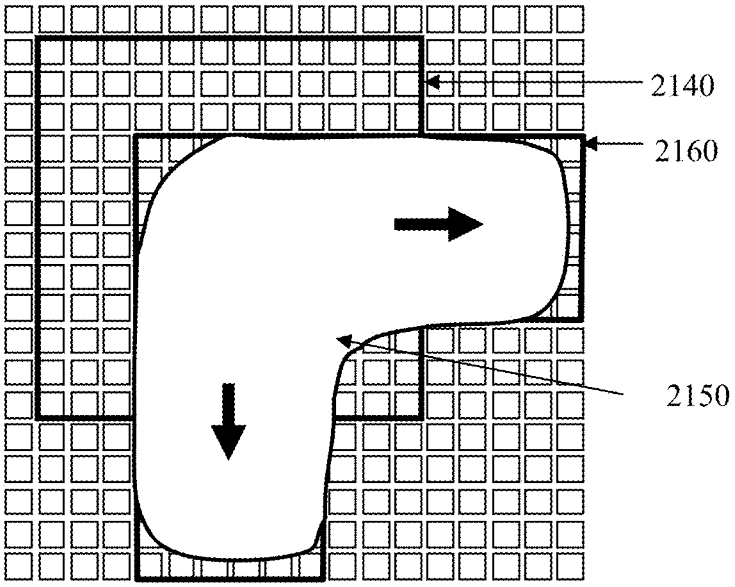

FIGS. 21A and 21B illustrate the microelectrode array mixer for improving the mixing speed. In one embodiment, an uneven back-and-forth mixer can be used to speed up the droplet mixing. This can be done by activating a group of microelectrodes to create an irreversible pattern that breaks the symmetry of the two circulations to improve the speed of mixing. The initial state is illustrated as in FIG. 21A that a droplet 2150 contains both sample and reagent sitting on top of configured electrode 2140. The first step for the uneven back-and-forth mixing is to activate configured electrode 2160 to deform the droplet 2150 to the direction of the arrows as shown in FIG. 21B. Then configured electrode 2160 is de-activated and configured electrode 2140 is activated to pull the droplet back to the original position as indicated in FIG. 21A. The back-and-forth mixing can be done multiple times to achieve the optimized mixing results. Also, the shapes of the configured-electrode 2140 and the deformed droplets in FIGS. 21A and 21B are for illustration purposes only. In one embodiment, the shapes can be any types of designs as long as they have the ability to create turbulent flows, or alternatively, the ability to create multilaminates.

Figure 22:
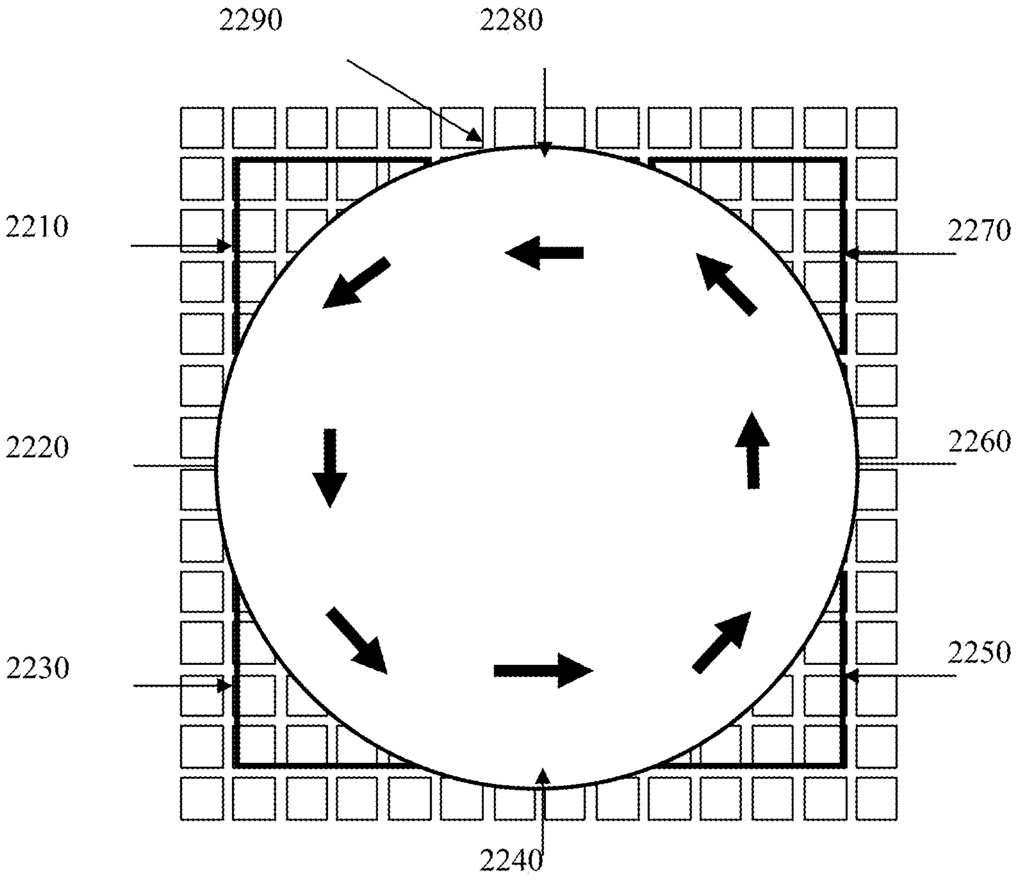
FIG. 22 is a diagram showing the circular mixer based on the EWOD Microelectrode Array Architecture.

Still in another embodiment of EWOD droplet based mixing procedure, FIG. 22 illustrates a circular mixer for improving the mixing speed. This can be done by activating a sequence of the smaller groups of microelectrodes to create an irreversible horizontal circulation that breaks the symmetry of the vertical laminar circulation to speed up the mixing. One embodiment, as shown in FIG. 22, is to form eight configured-electrodes (2210, 2220, 2230, 2240, 2250, 2260, 2270 and 2280) that enclose the droplet 2290 and then activate these configured electrodes one-by-one in sequence and in a circular manner. For example, in the first step, the configured electrode 2210 is activated for a short period of time to cause surface tension change and to create circulation inside the droplet 2290 on the configured electrode 2210. Next, the configured-electrode 2210 is deactivated followed by activating the next adjacent configured-electrode 2220. The circular activating procedure is repeated through entire eight configured electrodes (2210 to 2280) to create the horizontal circulation inside the droplet 2290. This circulation flow activation can be done multiple times based on the needs. In another embodiment, the circulation flow can be done clockwise, counter-clockwise or an alternative mix of the two to achieve the best mixing results. Still in another embodiment, the shapes of the configured-electrodes 2210 to 2280 can be other types and the circulation are for illustration purposes only. Still in another embodiment, such circulation mixing can be any types of designs as long as they have the ability to create turbulent flow, or alternatively, the ability to create multilaminates.

Figure 23A:
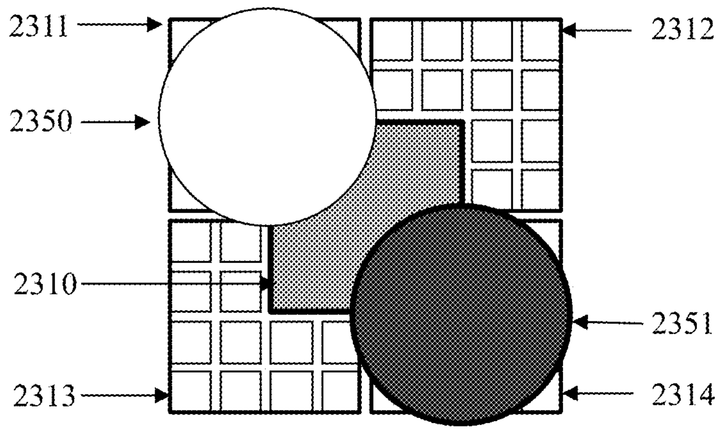
FIGS. 23A, 23B, 23C, 23D, 23E, and 23F are diagrams showing the multilaminates mixer based on the EWOD Microelectrode Array Architecture.
Figure 23B:
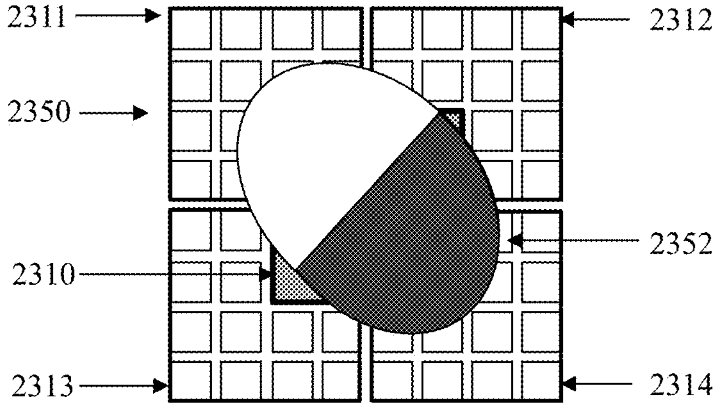
Figure 23C:
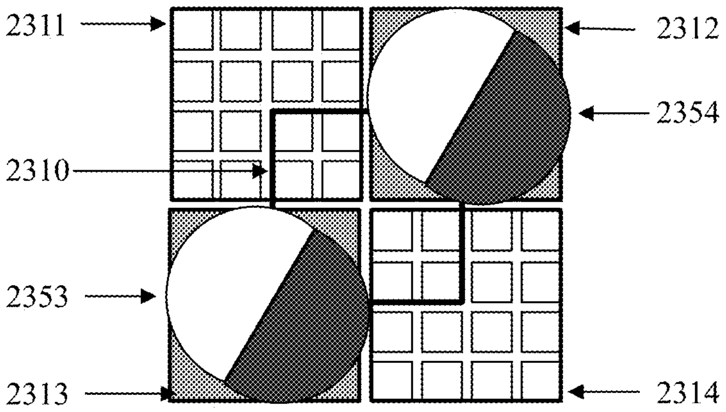
Figure 23D:
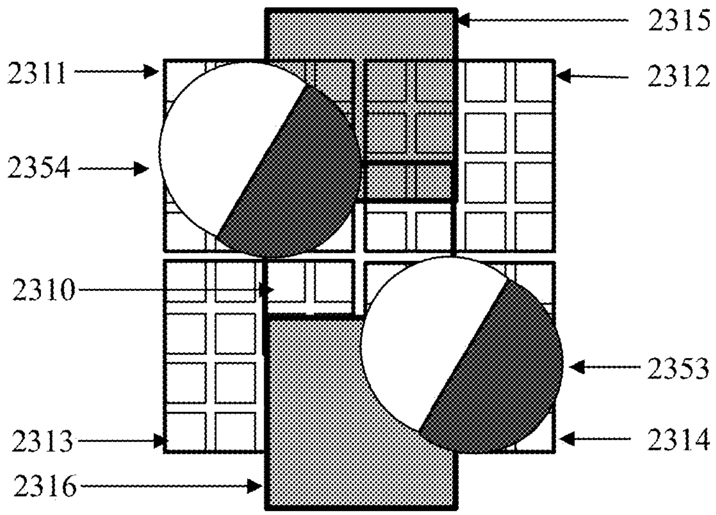
Figure 23E:
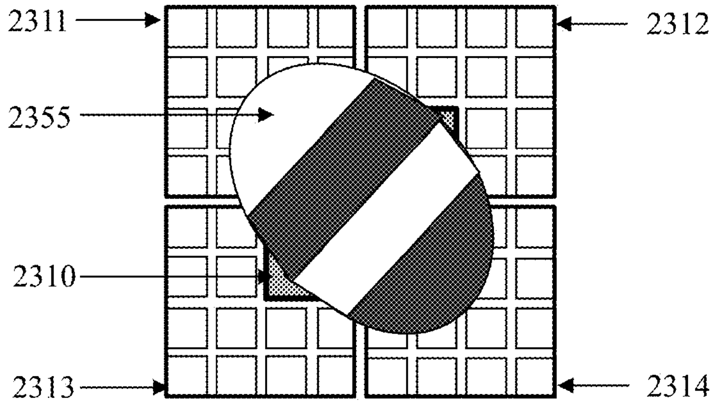
Figure 23F:
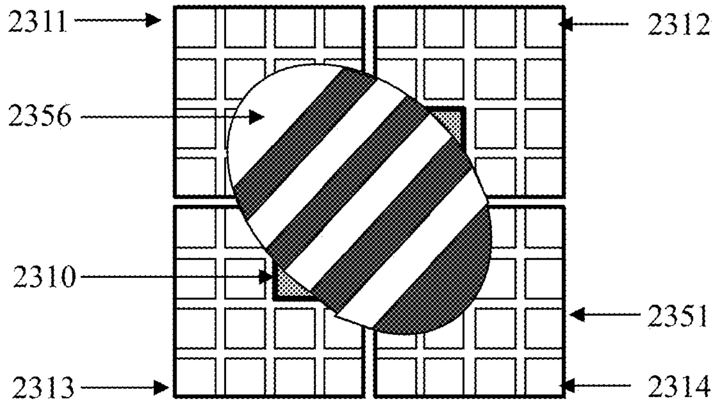

In one embodiment, a small footprint (2×2 configured-electrodes) mixer to create multilaminates to speed up the mixing procedure in EWOD microelectrode array architecture is achieved. This multilaminates mixer is especially useful for low aspect ratio (<1) situation. The aspect ratio is the ratio of the gap between electrode plate and the ground plate and the dimension of the electrode. Low aspect ratio means more difficult to create turbulent flow inside the droplet and the ability to create multilaminates becomes more important. One embodiment is illustrated in FIGS. 23A-23E. Diagonal mixing and diagonal cutting are used in this special mixer. The diagonal movement of the droplets can be done by the EWOD microelectrode array architecture. In FIG. 23A, the black droplet 2351 positioned at configured electrode 2314 will be mixed with the white droplet 2350 positioned at configured-electrode 2311. An interim configured electrode 2310 will be the mix chamber and will be activated to pull in both droplets 2351 and 2350. To start the multilaminates mixing, step one is to merge the two droplets diagonally. The diagonal direction of the droplet merge can be either 45 degree or 135 degree. The subsequent step of diagonal cutting will be perpendicular to this merge operation. FIG. 23B indicates the first merge of droplet 2351 and droplet 2350 into a black-and-white droplet 2352. Because of the low Reynolds number and the low aspect ratio, droplet 2352 has purely diffusion-based static mixing which results in a long mixing time, so the mixed droplet is shown as half white and half black. The second step is to do the diagonal cutting. Ninety degree from the starting diagonal mixing of droplet 2352 is illustrated in FIG. 23C. While the interim configured-electrode 2310 is deactivated, configured electrodes 2312 and 2313 and other interim configured-electrodes are activated to diagonally cut droplet 2352 into two daughter droplets 2353 and 2354 as shown in FIG. 23C. The details of the diagonal cutting are discussed in the above-described Diagonal Cutting procedure. Because of the slow mixing rate, so the two daughter droplets 2353 and 2354 keep the black/white laminates with the same orientation after the diagonal cutting. Then, the third step of the multilaminates mixing is to move the two droplets back onto the starting configured-electrodes to repeat the diagonal mixing and cutting. In FIG. 23D, droplets 2354 is moved from configured electrode 2312 onto next adjacent configured electrode 2311. Droplets 2353 is moved from configured electrode 2313 onto next adjacent configured-electrode 2314. This can be done by activating the electrodes 2311, 2314 and deactivate electrodes 2312 and 2313. Cares are needed to avoid the merge of droplets 2353 and 2354 during movement. For example, the deactivations of electrodes and activations of electrodes might cause a physical contact of the two droplets 2353, 2354 while they are moving and so the two droplets would merge together. In one embodiment, interim configured-electrodes 2315 and 2316 are activated first to create the safeguard zone between the two droplets to prevent accidental merge during their movement toward the desired electrodes. After droplets 2353 and 2354 are moved into configured-electrodes 2316 and 2315, move the two droplets into configured-electrodes 2311 and 2314. The procedure can be repeated to create the necessary numbers of multilaminates to speed up the mixing. FIG. 23E shows four-laminated droplet 2355 as the result of repeated steps to diagonally merge droplets 2353 and 2354 (from FIG. 23D) into droplet 2355. FIG. 23F illustrates eight-laminated droplet 2356 after repeated cycles of the multilaminates mixing.

Figure 24A:
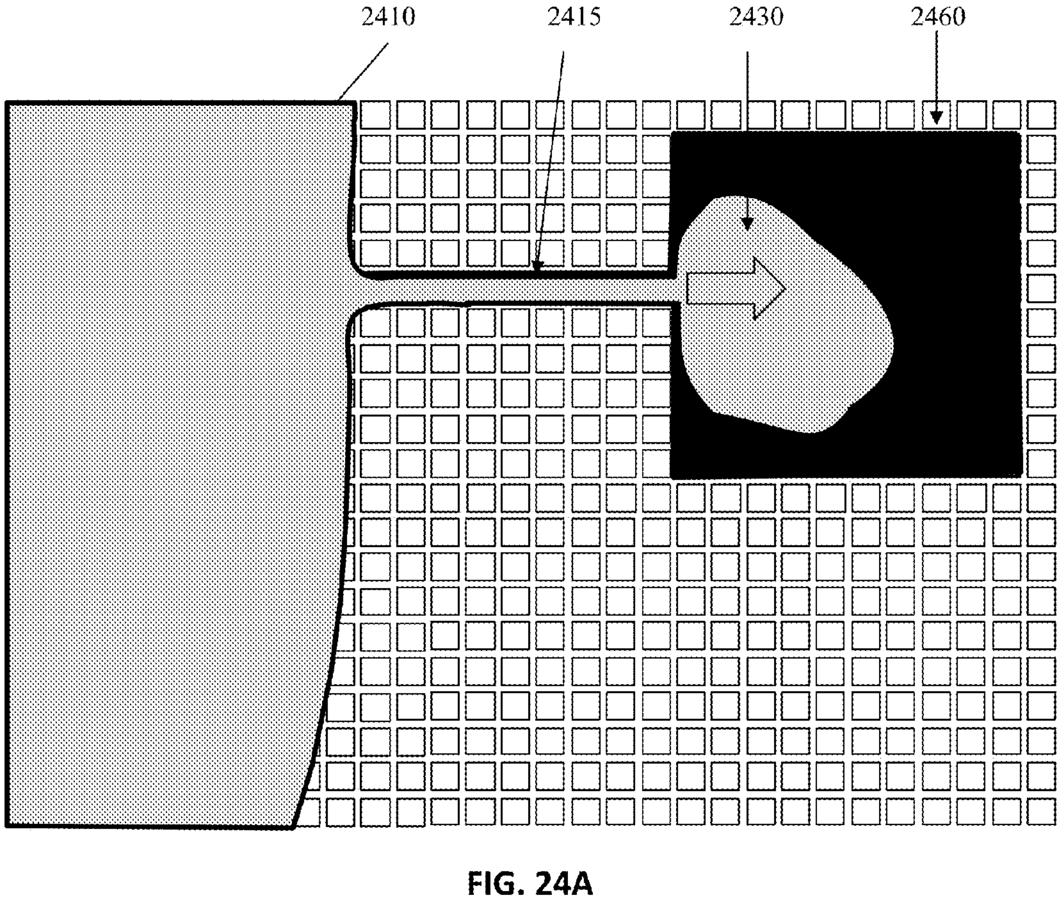
FIGS. 24A, 24B and 24C are illustrations of the creation of liquids by continuous-flow actuations.
Figure 24B:
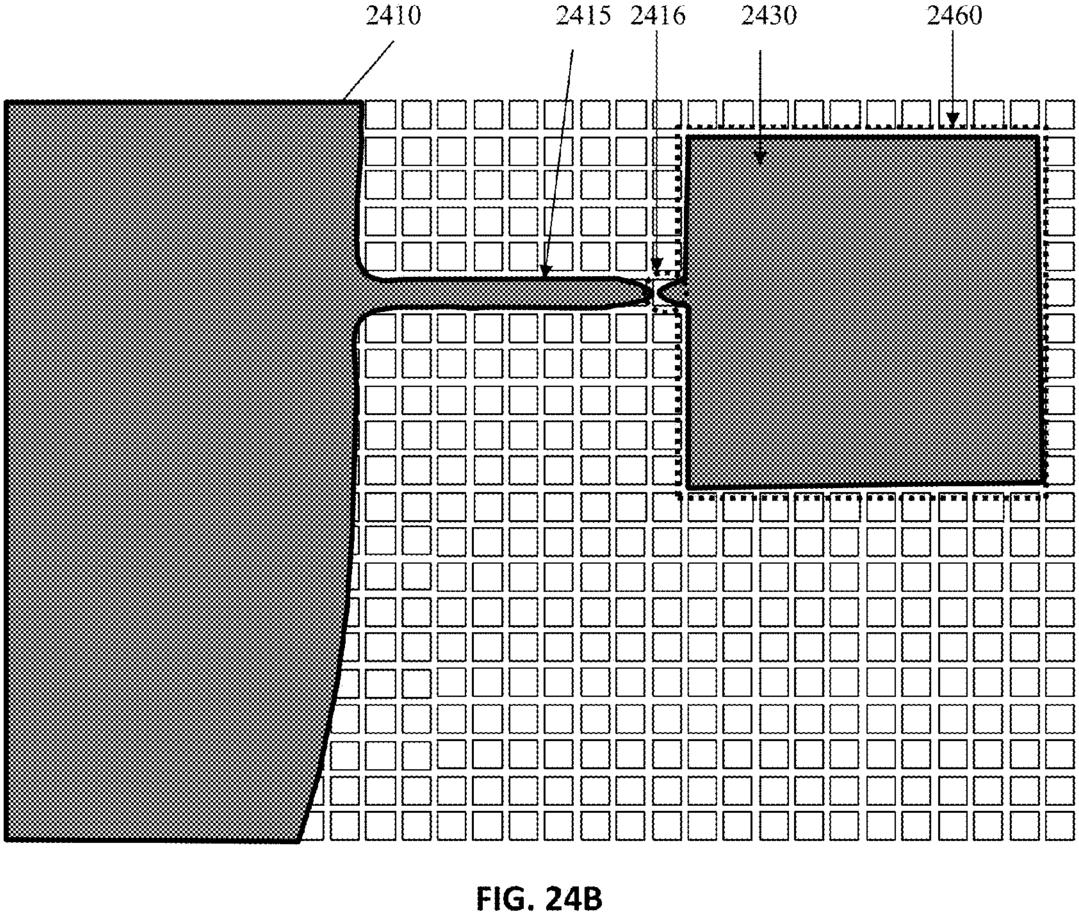
Figure 24C:
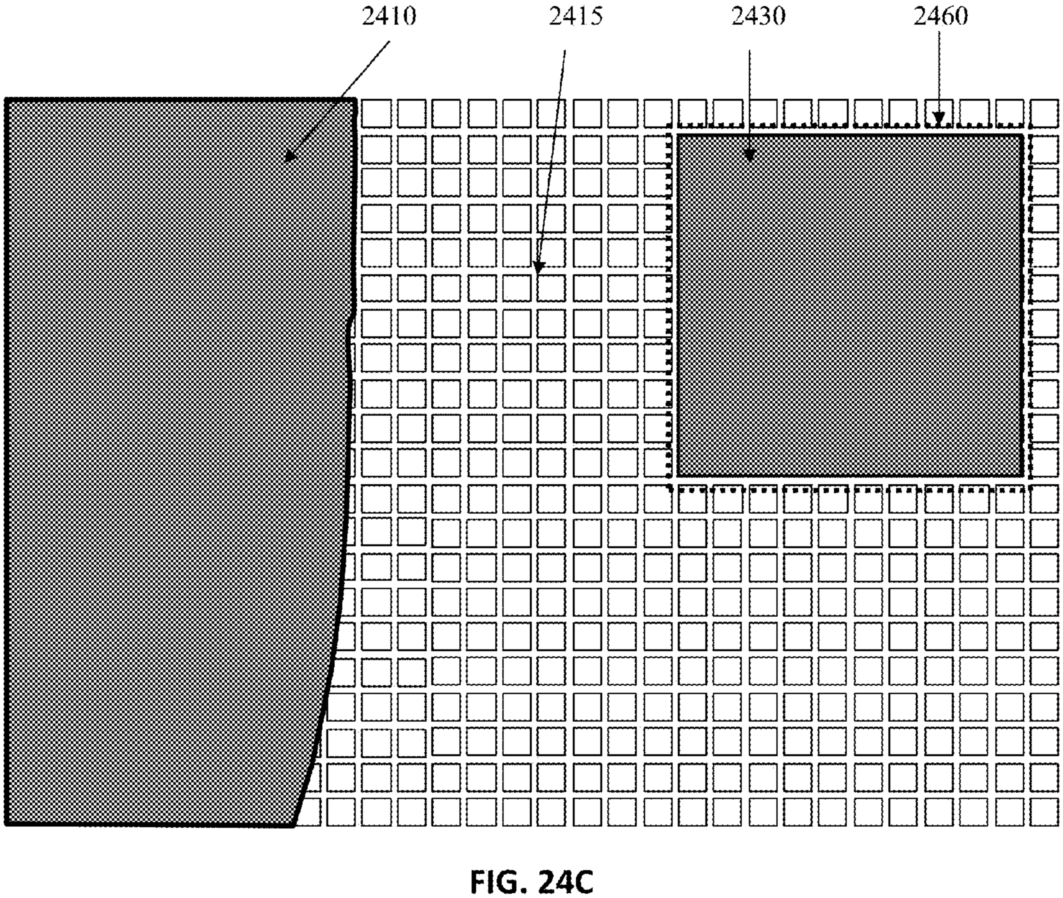

In various embodiments, EWOD Microelectrode Array Architecture can perform continuous-flow microfluidic operations instead of droplet-based microfluidic operations. Continuous microfluidic operations provide very simple in control but very effective way of doing microfluidic operations. FIGS. 24A-C illustrate the creation of a certain volume of liquid 2430 from the reservoir 2410. As shown in FIG. 24A, a small line of microelectrodes formed a bridge 2415 between the targeted configured-electrode 2460 and the reservoir 2410. When the bridge 2415 and the targeted configured-electrode 2460 are activated that causes a liquid flow from the reservoir into the targeted configured-electrode 2460. 2430 indicates the liquid flows from the bridge into the configured-electrode 2460. The bridge here is a single line of microelectrodes. This bridge configuration has the characteristics of both continuous-flow and droplet-based systems. It has all the benefits of a channel that once the bridge configured-electrode is activated the liquid will flow through it without extra controls and concerns on the activating timing and speeds. But it also has all the advantages of droplet-based system that once the bridge 2415 is deactivated all liquid will be pulled back to either the reservoir or the targeted configured-electrode 2460 and it has no dead-volume in the channel. Once the targeted configured-electrode 2460 is filled up then deactivated the bridge 2415 to cut the liquid 2430 from the reservoir 2410 as shown in FIG. 24B. The liquid fill-up of the configured-electrode 2460 is automatic that once all microelectrodes of the bridge and the configured-electrode electrode are filled up with liquid then the liquid flow from the reservoir 2410 will stop, so the timing control of the procedure is not critical. The creation of liquid 2430 can be precisely controlled by activating the appropriate microelectrodes 2460 and the breaking point of the bridge. As shown in FIG. 24B, liquid 2430 is breaking out from the reservoir 2410 by deactivating microelectrode 2416 first then the bridge is deactivated. This procedure will make sure most of the liquid formed the bridge will be pull back to the reservoir 2410 and the liquid 2430 will be precisely controlled by the number of microelectrodes of the configured-electrode 2460. In FIG. 24B, the configured-electrode 2460 is composed of 10×10 microelectrodes. Other sizes and shapes of the configured-electrodes can be defined to create different liquid sizes and shapes. FIG. 24C shows the disappearing of the liquid bridge and the liquid 2430 is created by activating reservoir 2410 and the configured-electrode 2460.

Figure 24D:
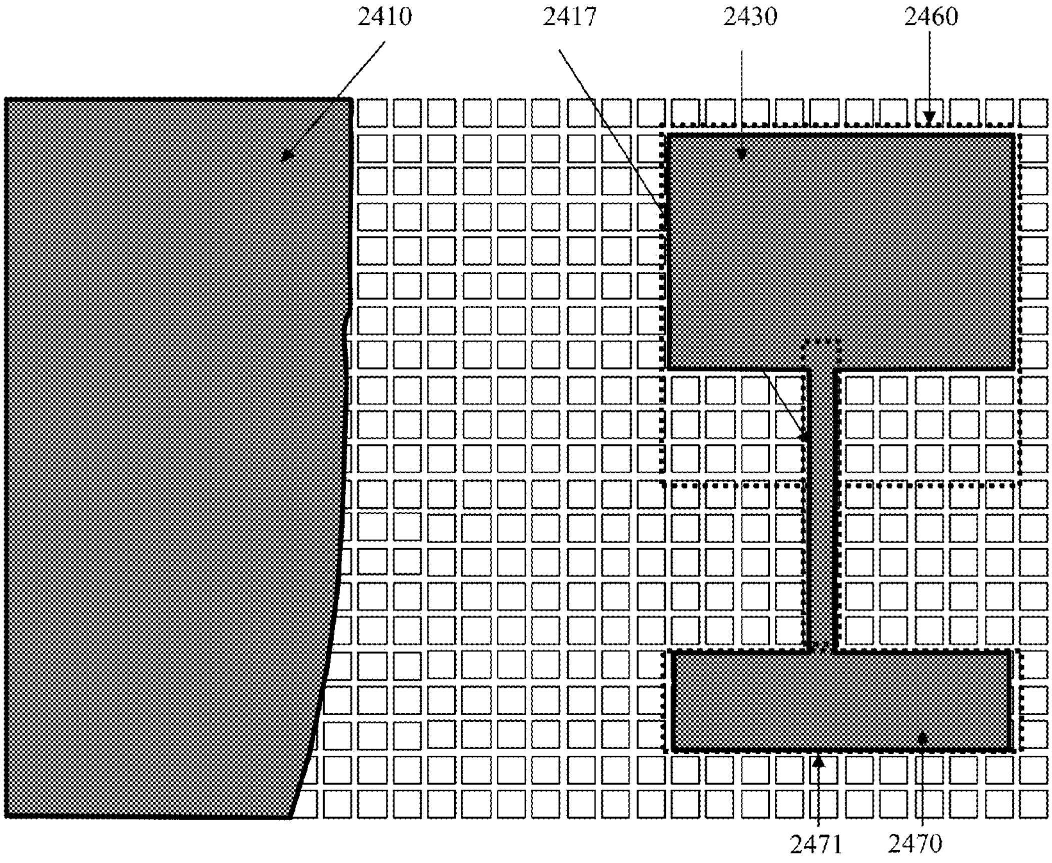
FIGS. 24D and 24E are illustrations of the cutting of liquid by continuous-flow actuations.
Figure 24E:
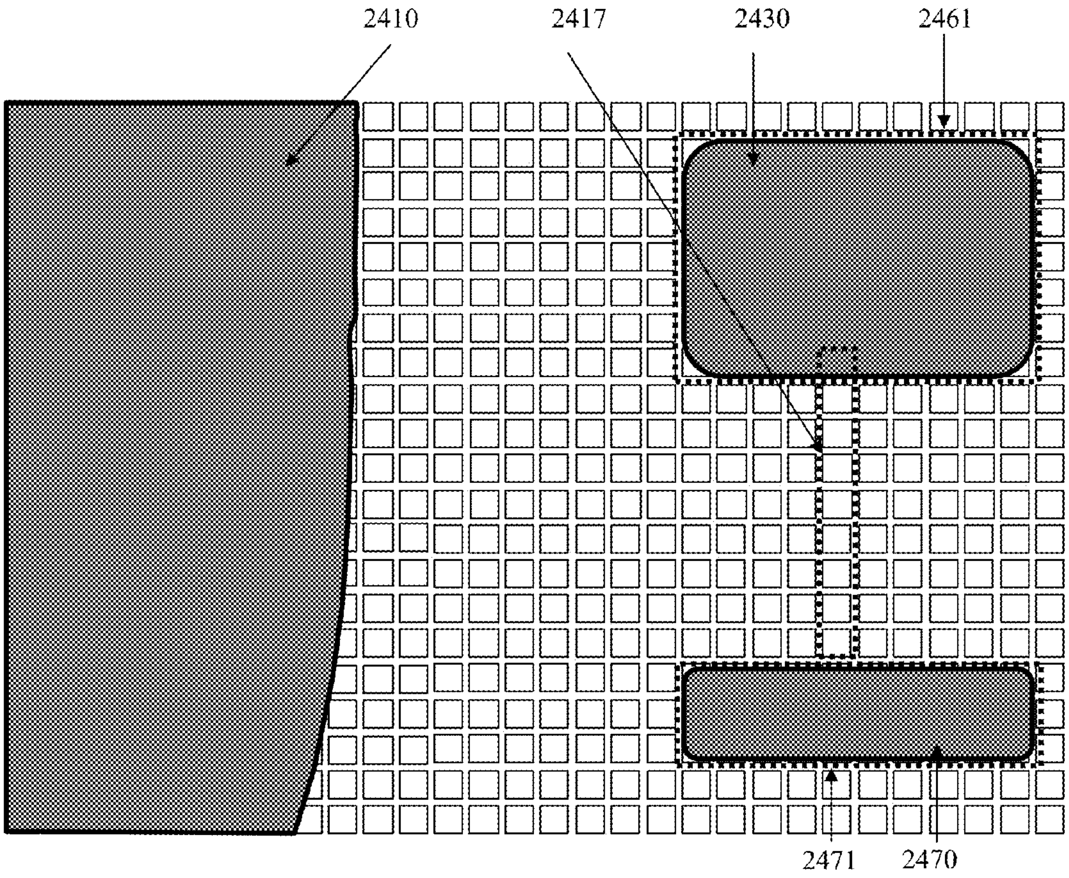

In one embodiment, the same creating procedure of liquid can be used to perform the cutting of the liquid into two sub-liquids as illustrated in FIG. 24D. After deactivating configured-electrode 2460, configured-bridge-electrode 2417 and targeted configured-electrode 2471 are activated and liquid flows from the bridge into the area of 2470. Deactivating the configured-bridge-electrode 2417, then activating configured-electrodes 2461 and 2471 breaks up and forms the two sub-liquids 2470 and 2430 as illustrated in FIG. 24E. This cutting process can generate the two sub-liquids in different sizes as long as the size of the configured-electrodes 2461 and 2471 are pre-calculated to the desired sizes.

Figure 25A:
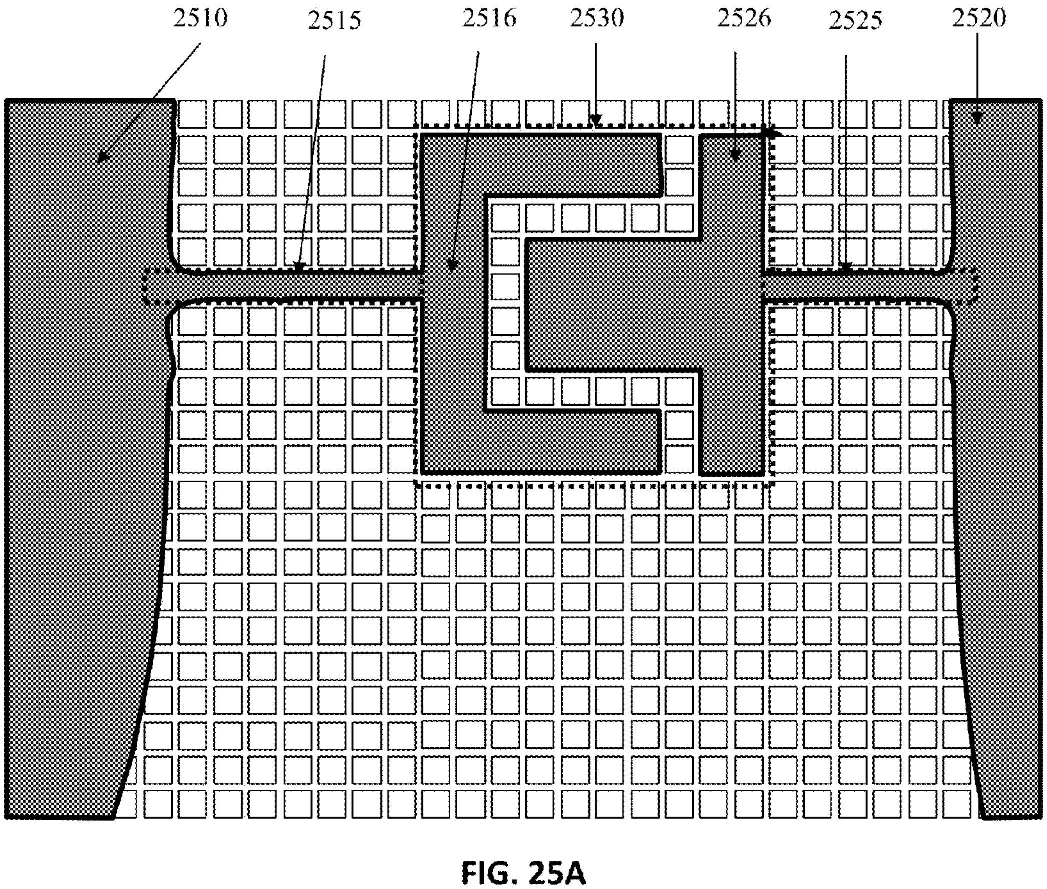
FIGS. 25A, 25B and 25C are illustrations of the merge/mixing of liquids by continuous-flow actuations.
Figure 25B:
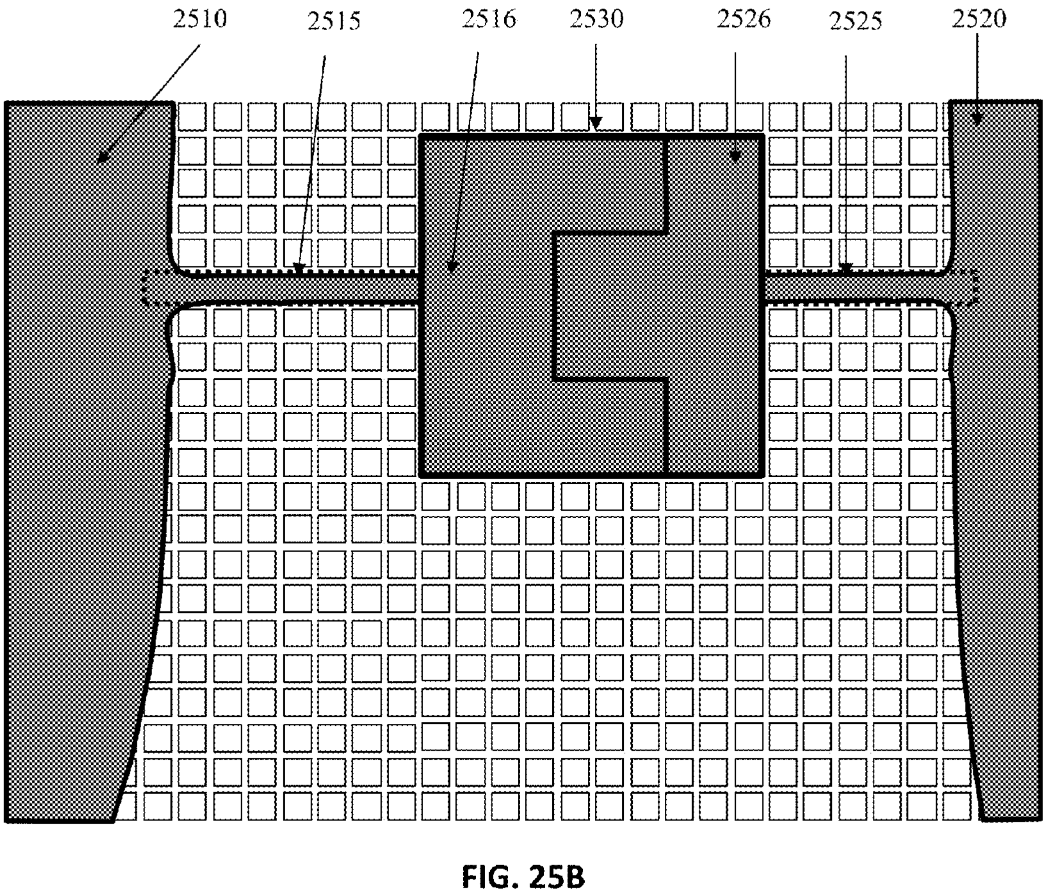
Figure 25C:
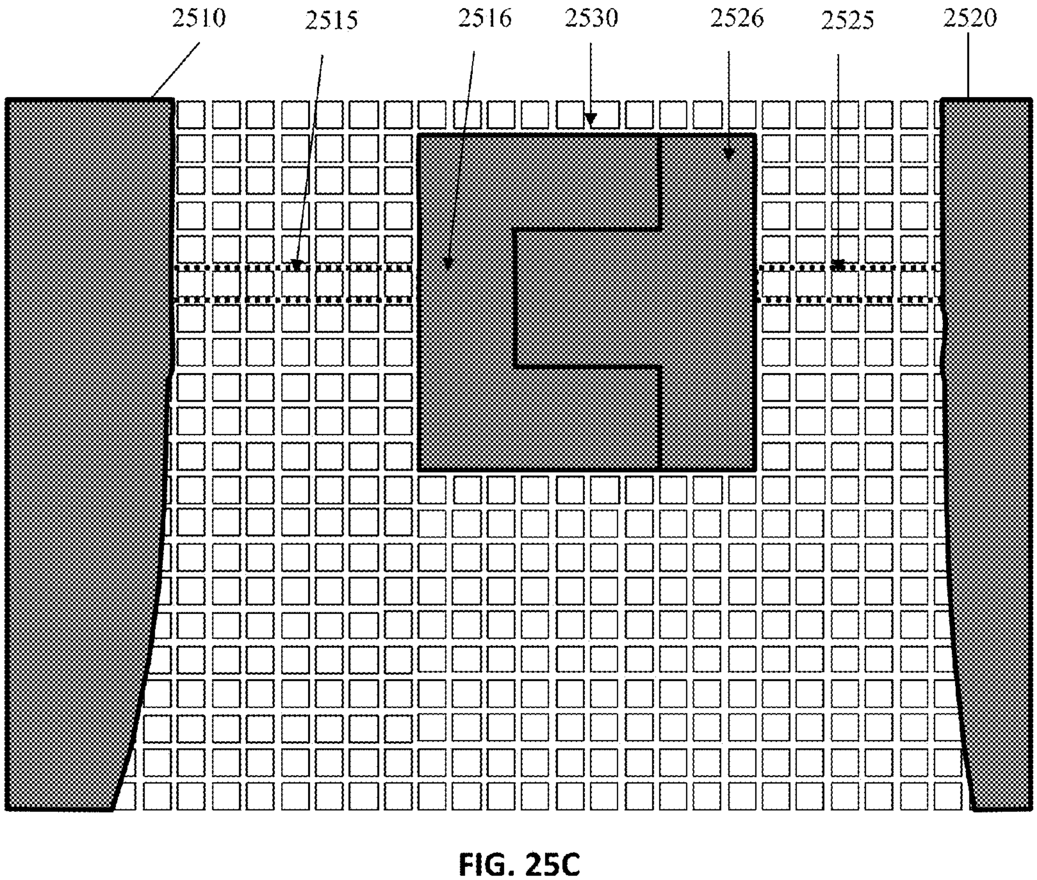

In another embodiment, FIGS. 25A-C illustrate the mixing procedure by the continuous-flow microfluidic operations. FIG. 25A shows the activating of bridges 2515 and 2525 and the activating of configured-electrodes 2516 and 2526, liquids are flowing from reservoirs 2510 and 2520 through the bridges into the mixing chamber 2530. Here liquids associate with configured-electrodes 2516 and 2526 are in de-formed shapes for better mixing and also liquids also are in different size for a ratio mixing. Gap is between configured-electrodes 2516 and 2526 to prevent the premature mixing. Once the liquid fill up both configured-electrodes 2516 and 2526, then configured-electrode 2530 (10×10-microelectrodes) is activated and the two liquid will be mixed as indicated in FIG. 25B. Then two bridge-electrodes are deactivated as illustrated in FIG. 25C.

In this simple mixing microfluidic operations, actually all fundamental microfluidic operations are demonstrated: (1) Creating: liquids 2516 and 2526 are created from reservoirs 2510 and 2520 in a precise way, (2) Cutting: liquid 2516 is cut off from liquid 2510 and liquid 2526 is cut from liquid 2520, (3) Transporting: Bridges 2515 and 2525 transport liquids to the mixing chamber, and (4) Mixing: liquid 2516 and 2526 are mixed at 2530. It's very obvious that this continuous-flow technique not only can be used to perform all microfluidic operations but also in a more precise way because the resolution of the precision is depend on the small microelectrode.

Figure 26A:
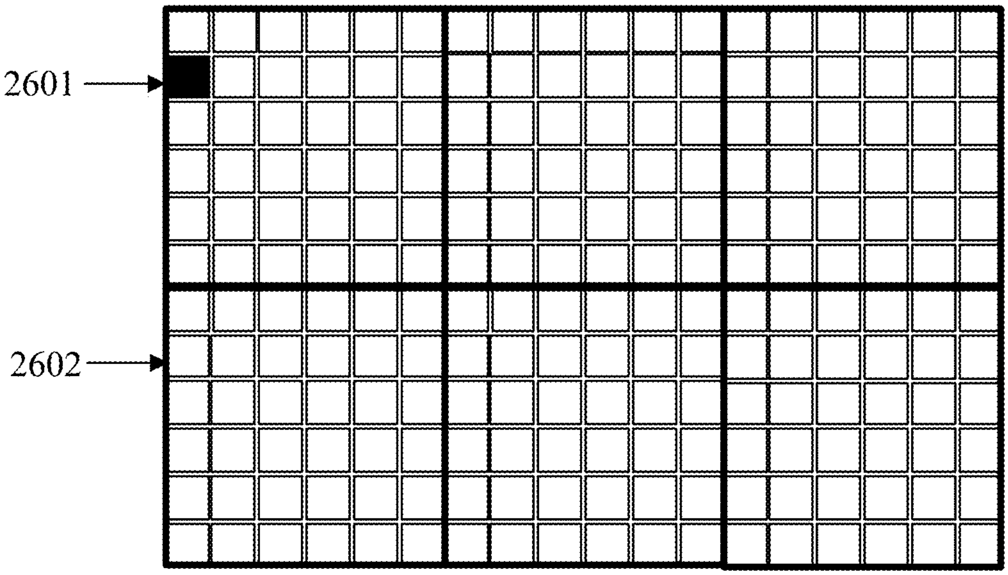
FIG. 26A illustrates an array of square microelectrodes and one of them is highlighted as 2601.
Figure 26B:
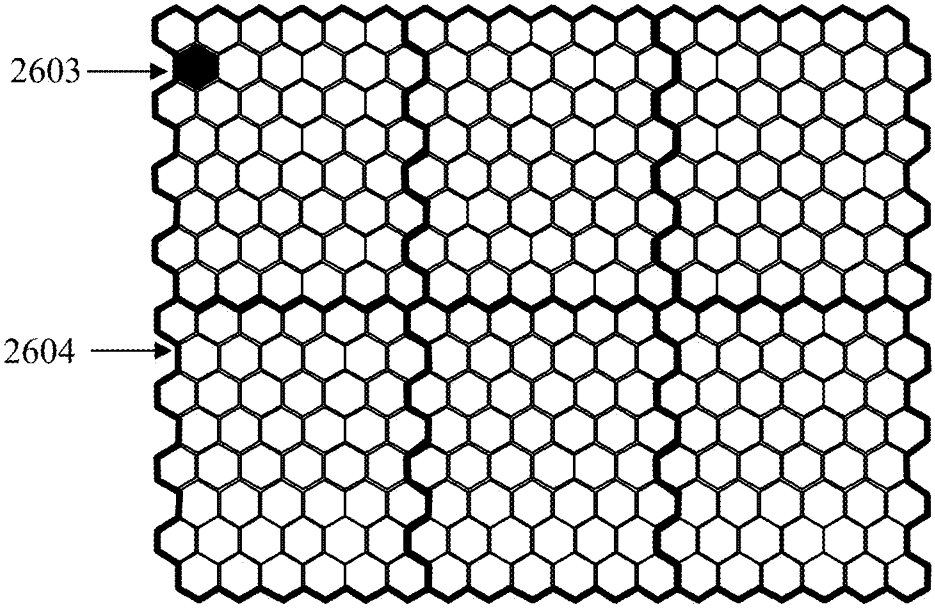
FIG. 26B shows an array of hexagon microelectrodes and one of them is highlighted as 2603.
Figure 26C:
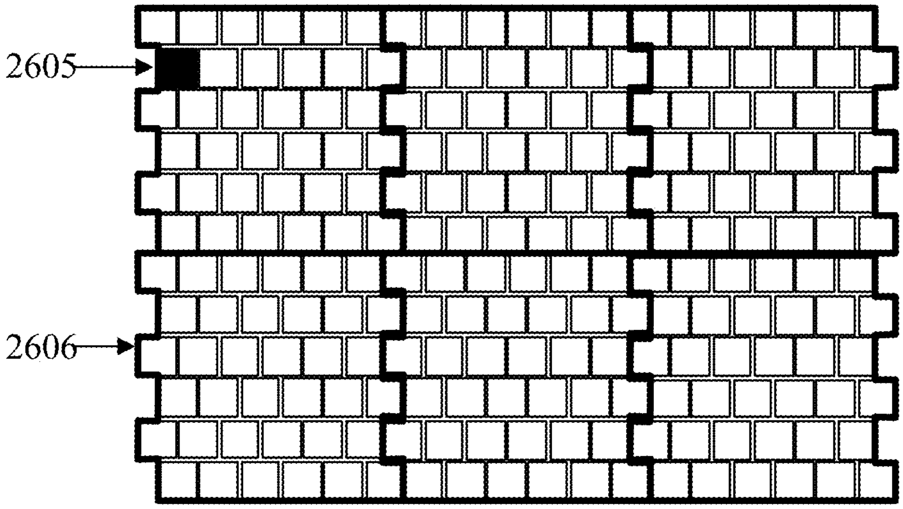
FIG. 26C shows an array of square microelectrodes that are arranged in a wall-brick layout and one of them is highlighted as 2605.

The shape of the microelectrode in FPLOC can be physically implemented in different ways. In one embodiment of the invention, FIG. 26A illustrates an array of square microelectrodes and one of them is highlighted as 2601. And 6×6 microelectrodes form the configured-electrode 2602. FIG. 26A totally have a 3×2 configured-electrodes. In another embodiment, FIG. 26B shows an array of hexagon microelectrodes and one of them is highlighted as 2603. And 6×6 microelectrodes form the configured-electrode 2604 and there are 3×2 configured-electrodes in FIG. 26B. The inter-digital edge of the hexagon microelectrode has the advantage in moving the droplet across the gap between the configured-electrodes. Yet in another embodiment, FIG. 26C shows an array of square microelectrodes that are arranged in a wall-brick layout and one of them is highlighted as 2605. And 6×6 microelectrodes form the configured-electrode 2606 and there are 3×2 configured-electrodes in FIG. 26C. The inter-digital edge of the hexagon microelectrode has the advantage in moving the droplet across the gap between the configured-electrodes, but this only happens on the x-axis. There are many other shapes of the microelectrodes can be implemented and not only limited to the three shapes discussed here.

Although the present invention has been described with reference to preferred embodiments, persons skilled in the art will recognize that changes may be made in form and detail without departing from the spirit and scope of the invention.

What is claimed is:

1. A method of manipulating droplet in a programmable EWOD microelectrode array comprising multiple microelectrodes, the method comprising: (a) constructing a bottom plate comprising an array of multiple microelectrodes disposed on a top surface of a substrate covered by a dielectric layer; wherein each of the microelectrodes is coupled to at least one grounding element of a grounding mechanism, wherein a hydrophobic layer is disposed on the top of the dielectric layer and the grounding elements to make hydrophobic surfaces with the droplets, and the grounding mechanism is a hybrid structure comprising a combination of a bi-planar structure and a coplanar structure with a selectable switch; (b) manipulating the multiple microelectrodes to configure a group of configured-electrodes to generate microfluidic components and layouts with selected shapes and sizes, wherein the group of configured-electrodes including: a first configured-electrode comprising a plurality of microelectrodes arranged in array, and at least one second adjacent configured-electrode adjacent to the first configured-electrode, the droplet being disposed on the top of the first configured-electrode and overlapped with a portion of the second adjacent-configured-electrode; and (c) manipulating one or more droplets among the group of configured-electrodes by sequentially applying driving voltages activating and de-activating one or more selected configured-electrodes to sequentially activate/deactivate the selected configured-electrodes to actuate droplets to move along a selected route.

2. The method of claim 1, further comprising manipulating numbers of the multiple microelectrodes of the group of configured-electrodes to control the sizes and shapes of the droplets.

3. The method of claim 1, wherein the microfluidic components of the group of configured-electrodes comprises reservoirs, electrodes, mixing chambers, detection windows, waste reservoirs, droplet pathways and predetermined functional electrodes.

4. The method of claim 3, wherein the layout of the microfluidic components comprises the physical allocations of input/output ports, reservoirs, electrodes, mixing chambers, detection windows, waste reservoirs, pathways and electrode networks.

5. The method of claim 1, wherein the grounding mechanism is fabricated on the top plate of the bi-planar structure wherein the top plate is above the bottom plate with a gap in-between.

6. The method of claim 1, wherein coplanar structure comprises ground grids.

7. The method of claim 1, wherein the coplanar structure comprises ground pads.

8. The method of claim 1, wherein the coplanar structure comprises programmed ground pads.

9. The method of claim 1, further comprising the method of accommodating the wide ranges of droplets with different sizes, wherein the grounding mechanism is fabricated on the top plate of the bi-planar structure wherein the top plate is above the bottom plate with a gap in-between, comprising: (i) configuring the height of the gap distance between the top plate and the bottom plate; (ii) configuring the size of the configured-electrode to control the size of the droplet resulting touching the top and bottom plates; and (iii) configuring the size of the configured-electrode to control the size of the droplet resulting touching only the bottom plate.

10. The method of claim 1, wherein the microelectrode can be generally round, square, hexagon bee-hive, or stacked-brick shapes arranged in array.

11. A method of manipulating droplet in a programmable EWOD microelectrode array comprising multiple microelectrodes, the method comprising: (a) constructing a bottom plate comprising an array of multiple microelectrodes disposed on a top surface of a substrate covered by a dielectric layer; wherein each of the microelectrodes is coupled to at least one grounding element of a grounding mechanism, wherein a hydrophobic layer is disposed on the top of the dielectric layer and the grounding elements to make hydrophobic surfaces with the droplets, and the grounding mechanism is a hybrid structure comprising a combination of a bi-planar structure and a coplanar structure with a selectable switch; (b) manipulating the multiple microelectrodes to configure a group of configured-electrodes to generate microfluidic components and layouts with selected shapes and sizes, wherein the group of configured-electrodes including: a first configured-electrode comprising a plurality of microelectrodes arranged in array, and at least one second adjacent configured-electrode adjacent to the first configured-electrode, the droplet being disposed on the top of the first configured-electrode and overlapped with a portion of the second adjacent-configured-electrode; (c) deactivating the first configured-electrode and activating the second adjacent configured-electrode to pull the droplet from the first configured-electrode onto the second configured-electrode, and (d) manipulating one or more droplets among the group of configured-electrodes by sequentially applying driving voltages activating and de-activating one or more selected configured-electrodes to sequentially activate/deactivate the selected configured-electrodes to actuate droplets to move along selected route.

12. The method of claim 11, further comprising splitting the droplet by using three configured-electrodes, wherein the droplet loaded on the first configured-electrode at the center overlaps with two second adjacent configured-electrodes, comprising: (i) configuring two interim configured-electrodes comprising multiple lines of microelectrodes covering the droplet loaded on the first configured-electrode; (ii) activating the two interim configured-electrodes; (iii) activating line-by-line moving toward the two second adjacent configured electrodes, deactivating the lines closest to the center to generally pull the droplet toward the two second adjacent configured-electrodes; and (iv) deactivating the two interim configured-electrodes, activating the two second adjacent configured-electrodes.

13. The method of claim 12, further comprising diagonally splitting the droplet, comprising: (i) deposing the droplet onto the first configured-electrode; (ii) deactivating the first configured-electrode and activating two diagonal-positioned second adjacent configured-electrodes overlapped with the first configured-electrode to pull the droplet toward the two diagonal-positioned second adjacent configured-electrodes; and (iii) deactivating the overlapped areas between the first configured-electrode and the two diagonal-positioned second adjacent configured-electrodes to pinch off the droplet into two sub-droplets.

14. The method of claim 11, further comprising splitting the droplet by using three configured-electrodes, wherein the droplet loaded on the first configured-electrode at the center wherein two neighboring configured-electrodes do not overlap with the droplet, comprising: (a) configuring two interim configured-electrodes comprising multiple lines of microelectrodes covering the droplet loaded on the first configured-electrode; (b) activating the two interim configured-electrodes; (c) activating line-by-line moving toward the two second adjacent configured electrodes, deactivating the lines closest to the center to generally pull the droplet toward the two second adjacent configured-electrodes; and (d) deactivating the two interim configured-electrodes, activating the two neighboring configured-electrodes.

15. The method of claim 11, further comprising splitting the droplet by using three configured-electrodes, wherein the droplet disposed on the first configured-electrode at the center overlaps partially with the two second adjacent configured-electrodes, comprising: (i) deactivating the first configured-electrode; and (ii) activating the two second adjacent configured-electrodes to generally pull and cut the droplet.

16. The method of claim 11, further comprising repositioning droplets back into a reservoir, comprising: (i) generating an interim configured-electrode, wherein the interim configured-electrode overlaps with a portion of the reservoir and with a portion of the droplet not overlapping with the reservoir; (ii) activating the interim configured-electrode to drag the droplet to at least partially overlap with the reservoir; and (iii) deactivating the interim configured-electrode and activating the reservoir to generally pull the droplet into the reservoir.

17. The method of claim 11, further comprising the method of coplanar splitting, including: (i) configuring a band interim configured-electrode overlapping with the droplet; (ii) deactivating the first configured-electrode and activating the band interim configured-electrode; (iii) deactivating the interim configured-electrode; and (iv) activating the first configured-electrode and the second adjacent configured-electrode.

18. The method of claim 11, further comprising the method of merging the two droplets together by using three configured-electrodes wherein two first configured-electrodes are separated by the second adjacent configured-electrode, comprising: (i) deactivating the two first configured-electrodes; and (ii) activating the second adjacent configured-electrode in the middle.

19. The method of claim 18, further comprising the method of deformed mixing, comprising: (i) generating two interim configured-electrodes to deformed shapes of the two droplets; (ii) deactivating the two first configured-electrodes and activating the two interim configured-electrodes; and (iii) deactivating the two interim configured-electrodes and activating the second adjacent configured-electrode in the middle.

20. The method of claim 11, further comprising the method of speeding the mixing inside the droplet by deforming the droplet shape, comprising: (i) generating the interim configured-electrode to deform the droplet shape; (ii) deactivating the first configured-electrode and activating the interim configured-electrode; (iii) deactivating the interim configured-electrode and activating the first configured-electrode; and (iv) repeating the deactivation and activation of the interim and first configured-electrode.

21. The method of claim 11, further comprising the method of speeding the mixing inside the droplet by circulating inside the droplet, comprising: (i) generating multiple interim configured-electrodes to encircle the droplet; and (ii) activating and deactivating each of the interim configured-electrodes of one at a time in a clockwise direction to mix the droplet in circular motion.

22. The method of claim 21 further comprising: activating and deactivating each of the interim configured-electrodes one at a time in a counter clockwise direction.

23. The method of claim 11, further comprising the method of creating multilaminated mixing of the droplets, comprising: (i) configuring a 2.times.2 array of configured-electrodes comprising two first configured-electrodes in the first diagonal position; (ii) generating an interim configured-electrode being centered in the 2.times.2 array of the configured-electrodes; (iii) activating the interim configured-electrode to merge the two first droplets from the two first configured-electrodes; (iv) deactivating the interim configured-electrodes and activating the two configured-electrodes in the second diagonal position; (v) deactivating the interim configured-electrode to cut the droplet into the second two droplets; (vi) transporting the second two droplets back to the first configured-electrodes in the first diagonal position by activating two extra interim configured-electrodes, and then deactivating the two extra interim configured-electrodes and activating the two first configured-electrodes in the first diagonal position to complete the transportation; (vii) activating the interim configured-electrode to merge the two second droplets from the two first configured-electrodes; and (viii) repeating diagonal splitting, transportation and diagonal merging.

24. The method of claim 11, further comprising the method of creating the droplet, comprising: (i) configuring a primary interim configured-electrode in a reservoir; (ii) configuring a line of adjacent configured-electrodes from the reservoir loaded with the liquid; (iii) generating a secondary interim configured-electrode overlapping the liquid in the reservoir and overlapping the closest adjacent configured-electrode; (iv) activating the primary interim configured-electrode; (v) deactivating the secondary interim configured-electrode and activating the closest adjacent configured-electrode; and (vi) deactivating the previous activated adjacent configured-electrode and activating the consequential adjacent configured-electrode in the line series until the droplet is created.

25. The method of claim 11, further comprising the method of creating the droplet using droplet aliquots technique, comprising: (i) generating a target configured-electrode for the desired droplet size; (ii) configuring a line of adjacent configured-electrodes from a reservoir loaded with liquid connected to the target configured-electrode wherein both ends of the line of adjacent configured-electrodes overlap with the reservoir and the target configured-electrode; (iii) activating the target configured-electrode; (iv) activating and deactivating each one of the adjacent configured-electrodes one at a time loaded with the micro-aliquot in sequence along the path from the reservoir side to the target configured-electrode; and (v) repeating activating and deactivating sequence of the adjacent configured-electrode to create the desired droplet in the target configured-electrode.

26. The method of claim 25 further comprising: pre-calculating the numbers of the micro-aliquots.

27. The method of claim 11, further comprising the method of calculating the volume of the droplet loaded on the first configured-electrode using droplet aliquots technique, comprising: (i) generating a storage configured-electrode; (ii) configuring an interim configured-electrode inside the first configured-electrode; (iii) configuring a line of adjacent configured-electrodes from the first configured-electrode loaded with droplet connected to the storage configured-electrode wherein both ends of the line of adjacent configured-electrodes overlap with the first configured-electrode and the storage configured-electrode; (iv) activating the interim configured-electrode; (v) activating the storage configured-electrode; (vi) activating and deactivating each one of the small adjacent configured-electrodes one at a time loaded with the micro-aliquot in sequence along the path from the first configured-electrode side to the storage configured-electrode; and (vii) repeating activating and deactivating sequence of the adjacent configured-electrode to calculating the total numbers of the micro-aliquots.

28. The method of claim 11, further comprising the method of moving the droplet using column actuation, comprising: (i) configuring a column configured-electrode comprising multiple columns of microelectrodes; and (ii) sweeping the column configured-electrode across the droplet by activating and deactivating sub columns of the column configured-electrode along the target direction.

29. The method of claim 11, further comprising the method of sweeping dead volumes on the electrode surface, comprising: (i) configuring a column configured-electrode, comprising multiple columns of microelectrodes, with the length to cover all dead volumes; and (ii) sweeping the column configured-electrode across all dead volumes by activating and deactivating the sub columns of the column configured-electrode along the target direction.

30. The method of claim 11 wherein a reservoir is loaded with liquid.

31. The method of claim 11, further comprising the method of creating the different shape and size of the liquid using continuous flow, wherein a reservoir is loaded with liquid, comprising: (i) configuring a target configured-electrode for the desired liquid size and shape; (ii) configuring a bridge configured-electrode, comprising a line of microelectrodes, connecting to the reservoir and the target configured-electrode; (iii) activating the bridge configured-electrode and the target configured-electrode; and (iv) deactivating the bridge configured-electrode by first deactivating a group of microelectrodes of the bridge configured-electrode closest to the target configured-electrode.

32. The method of claim 11, further comprising the method of splitting the liquid into two sub-liquids with controlled sizes and splitting ratio using continuous flow, wherein a reservoir is loaded with liquid, comprising: (i) configuring the first target configured-electrode overlapped with the liquid with a pre-defined first sub-liquid size and shape; (ii) configuring the second target configured-electrode with the pre-defined second sub-liquid size and shape; (iii) configuring the bridge configured-electrode, comprising a line of microelectrodes, connecting to the first target configured-electrode and the second target configured-electrode; (iv) activating the bridge configured-electrode and the second target configured-electrode; (v) deactivating the bridge configured-electrode; and (vi) activating the first target configured-electrode.

33. The method of claim 11, further comprising the method of merging two liquids with controlled size, shape and merging ratio using continuous flow, wherein a reservoir is loaded with liquid, comprising: (i) configuring the mixing configured-electrode; (ii) configuring the first and second target configured-electrodes overlap with the mixing configured-electrode; (iii) configuring the first bridge configured-electrode, comprising a line of microelectrodes, connecting to the first target configured-electrode and the first liquid source; (iv) configuring the second bridge configured-electrode, comprising a line of microelectrodes, connecting to the second target configured-electrode and the second liquid source; (v) activating the first and second bridge configured-electrodes and the first and second target configured-electrodes; (vi) deactivating the first and second bridge configured-electrodes; and (vii) activating the mixing configured-electrode.

34. A method of manipulating droplet in a programmable EWOD microelectrode array comprising multiple microelectrodes, the method comprising: a. constructing a bottom plate comprising an array of multiple microelectrodes disposed on a top surface of a substrate covered by a dielectric layer; wherein each of the microelectrodes is coupled to at least one grounding element of a grounding mechanism, wherein a hydrophobic layer is disposed on the top of the dielectric layer and the grounding element to make hydrophobic surfaces with the droplets, and the grounding mechanism is a hybrid structure comprising a combination of a bi-planar structure and a coplanar structure with a selectable switch; b. manipulating the multiple microelectrodes to configure a group of configured-electrodes to generate microfluidic components and layouts with selected shapes and sizes, wherein the group of configured-electrodes including: a first configured-electrode comprising a plurality of microelectrodes arranged in array, and at least one second adjacent configured-electrode adjacent to the first configured-electrode, the droplet being disposed on the top of the first configured-electrode and overlapped with a portion of the second adjacent-configured-electrode; c. configuring a third neighboring configured-electrode not overlapped with the droplet on the first configured-electrode; and d. manipulating one or more droplets among the group of configured-electrodes by sequentially applying driving voltages activating and de-activating one or more selected configured-electrodes to sequentially activate/deactivate the selected configured-electrodes to actuate droplets to move along selected route.

35. The method of claim 34, wherein the third neighboring configured-electrode comprises a plurality microelectrodes arranged in array.

36. The method of claim 34, further comprising the method of diagonal moving the droplet, comprising: (i) generating an interim configured-electrode being overlapped with a portion of the droplet, and third neighboring configured-electrode; (ii) transporting the droplet diagonally from the first configured-electrode onto the third neighboring configured-electrode by deactivating the first configured-electrode and activating the interim configured-electrode; and (iii) deactivating the interim configured-electrode, and activating the third neighboring configured-electrode.

37. The method of claim 34, further comprising the method of droplet movement in all directions, comprising: (i) generating an interim configured-electrode being overlapped with a portion of the droplet, and third neighboring configured-electrode; (ii) transporting the droplet from the first configured-electrode onto the third neighboring configured-electrode by deactivating the first configured-electrode and activating the interim configured-electrode; and (iii) deactivating the interim configured-electrode, and activating the third neighboring configured-electrode.

38. The method of claim 34, further comprising the method of moving the droplet with bridging between the first configured-electrode in line with the third neighboring configured-electrode, comprising: (i) generating a bridging configured-electrode comprising the third neighboring configured-electrode and extended bridging area which overlaps with the droplet; (ii) deactivating the first configured-electrode and activating the bridging configured-electrode; and (iii) deactivating the bridging configured-electrode and activating the third neighboring configured-electrode.

* * * * *